US011307597B2

United States Patent
Pedersen et al.

(10) Patent No.: US 11,307,597 B2
(45) Date of Patent: Apr. 19, 2022

(54) TELE-OPERATION OF AUTONOMOUS CARS TO NEGOTIATE PROBLEM SITUATIONS

(71) Applicants: Nissan North America, Inc., Franklin, TN (US); United States of America as Represented by the Administrator of NASA, Washington, DC (US)

(72) Inventors: Liam Pedersen, San Francisco, CA (US); Maarten Sierhuis, San Francisco, CA (US); Hans Utz, Campbell, CA (US); Mauro Della Penna, San Francisco, CA (US); Terrence Fong, Moffett Field, CA (US); Mark Allan, Campbell, CA (US); Maria Bualat, San Jose, CA (US); Eric Schafer, Kentfield, CA (US)

(73) Assignees: Nissan North America, Inc., Franklin, TN (US); United States of America as Represented by the Administrator of NASA, Washington, DC (US)

( * ) Notice: Subject to any disclaimer, the term of this patent is extended or adjusted under 35 U.S.C. 154(b) by 156 days.

(21) Appl. No.: 16/890,506

(22) Filed: Jun. 2, 2020

(65) Prior Publication Data
US 2020/0293065 A1  Sep. 17, 2020

Related U.S. Application Data

(63) Continuation of application No. 16/348,726, filed as application No. PCT/US2017/063821 on Nov. 30, 2017, now Pat. No. 10,705,539.
(Continued)

(51) Int. Cl.
G05D 1/02  (2020.01)

(52) U.S. Cl.
CPC ......... *G05D 1/0291* (2013.01); *G05D 1/0212* (2013.01); *G05D 1/0276* (2013.01);
(Continued)

(58) Field of Classification Search
None
See application file for complete search history.

(56) References Cited

U.S. PATENT DOCUMENTS 9,310,802 B1 *  4/2016  Elkins ................. G05D 1/0027
10,031,520 B2  7/2018  Rodas
(Continued)

FOREIGN PATENT DOCUMENTS

JP  2008-076310 A  4/2008
JP  2013-196632 A  9/2013
(Continued)

OTHER PUBLICATIONS

Fong, T. et al. Vehicle teleoperation interfaces. Autonomous robots, 2001, 11(1), pp. 9-18.
(Continued)

*Primary Examiner* — Todd Melton
(74) *Attorney, Agent, or Firm* — Young Basile Hanlon & MacFarlane, P.C.

(57) ABSTRACT

Methods and systems for providing remote support and negotiating problem situations of autonomous operation of vehicles based on signal states and vehicle information are described. A system comprises a memory and a processor configured to execute instructions stored in the memory to: assign vehicles to support queues based on state data, generate a map display including locations of the vehicles, and generate a state display including the support queues, vehicle manager indicators corresponding to the support queues and state indicators corresponding to the state data.

20 Claims, 15 Drawing Sheets

Related U.S. Application Data

(60) Provisional application No. 62/428,002, filed on Nov. 30, 2016.

(52) U.S. Cl.
CPC ......... G05D 1/0287 (2013.01); G05D 1/0297 (2013.01); *G05D 2201/0213* (2013.01)

(56) References Cited

U.S. PATENT DOCUMENTS

| | | | |
|---|---|---|---|
| 10,168,674 B1 * | 1/2019 | Buerger | G05D 1/0088 |
| 10,649,453 B1 | 5/2020 | Svegliato et al. | |
| 2002/0023164 A1 | 2/2002 | Lahr | |
| 2015/0039157 A1 | 2/2015 | Wolfe et al. | |
| 2015/0248131 A1 | 9/2015 | Fairfield et al. | |
| 2016/0311423 A1 | 10/2016 | Storm | |
| 2016/0334230 A1 | 11/2016 | Ross et al. | |
| 2017/0123419 A1 | 5/2017 | Levinson et al. | |
| 2017/0270802 A1 | 9/2017 | Vignati et al. | |
| 2018/0082494 A1 | 3/2018 | Rech et al. | |
| 2018/0105175 A1 | 4/2018 | Muller et al. | |
| 2018/0136651 A1 | 5/2018 | Levinson et al. | |
| 2019/0187691 A1 | 6/2019 | Magzimof et al. | |
| 2019/0270408 A1 | 9/2019 | Castro et al. | |

FOREIGN PATENT DOCUMENTS

| | | |
|---|---|---|
| JP | 2015-509195 A | 3/2015 |
| JP | 2016-095851 A | 5/2016 |
| JP | 5957744 B1 | 7/2016 |
| JP | 5957745 B1 | 7/2016 |
| WO | 2013/128920 A1 | 9/2013 |

OTHER PUBLICATIONS

Rothgeb, M., Intelligent autonomy for reducing operator workload. State College, PA: The Pennsylvania State University Applied Research Laboratory. 2007.

European Search Report from corresponding application EP 17876896.6, dated Nov. 4, 2019; 9 page.

Davies; Nissan's Path to Self-Driving Cars: Humans in Call Centers: Wired; Jan. 5, 2017; Retrieved Feb. 19, 2020; https://www.wired.com/2017/01/nissans-self-driving-teleoperation/.

* cited by examiner

TELE-OPERATION OF AUTONOMOUS CARS TO NEGOTIATE PROBLEM SITUATIONS

CROSS-REFERENCE TO RELATED APPLICATION(S)

This application is a continuation of Ser. No. 16/348,726 filed May 9, 2019, which is a 371 of International Application PCT/US2017/063821 filed Nov. 30, 2017, which claims priority to and the benefit of U.S. Provisional Application Patent Ser. No. 62/428,002, filed Nov. 30, 2016, the entire disclosures of which are hereby incorporated by reference.

TECHNICAL FIELD

This application relates to vehicle interfaces for autonomous vehicle monitoring, including methods, apparatuses, systems, and non-transitory computer readable media for the remote monitoring and tele-operation of autonomous vehicles.

BACKGROUND

Increasing autonomous vehicle usage creates the potential for more efficient movement of passengers and cargo through a transportation network. Moreover, the use of autonomous vehicles can result in improved vehicle safety and more effective communication between vehicles. However, even in situations that autonomous vehicles are individually effective, the interaction between groups of autonomous vehicles can result in unexpected disruptions when parameters of the autonomous vehicles programming are exceeded. When the number of autonomous vehicles passes a certain threshold, it becomes inefficient to use human supervision to monitor the autonomous vehicles on a one to one basis. As such, existing ways of monitoring autonomous vehicles do not organize the monitoring of autonomous vehicle state in an efficient manner.

SUMMARY

Disclosed herein are aspects, features, elements, implementations, and implementations for remote support of autonomous operation of vehicles.

An aspect of the disclosed implementations includes a system for remote support of autonomous operation of vehicles, the system comprising: a communication system that receives state data from the vehicles, and that transmits instruction data to the vehicles, the vehicles including a first vehicle; first level control stations that display the state data from the vehicles, the first level control stations including a first control station that, in response to a change in the state data indicating that autonomous operation of the first vehicle is operating outside of defined parameter values, transmits instruction data to the first vehicle through the communication system; and a second level control station associated with the first level control stations that allocates responsibility for the vehicles among the first level control stations.

An aspect of the disclosed implementations includes a method for providing remote support of autonomous operation of vehicles, the method comprising: receiving, by a remote vehicle support apparatus, state data for the vehicles, wherein the state data includes a current state of the vehicles; assigning, by the remote vehicle support apparatus, the vehicles to remote vehicle support queues based on the state data; receiving, by the remote vehicle support apparatus, an indication that a vehicle of the vehicles is requesting remote support; and in response to a determination that a change in the state data indicates that autonomous operation of the vehicle is operating outside of defined parameter values, transmitting, by the remote vehicle support apparatus, instruction data to the vehicle, wherein the instruction data modifies the autonomous operation of the vehicle.

An aspect of the disclosed implementations includes a method for remote support, the method comprising: ranking, by a remote vehicle support apparatus, vehicles based on state data of the vehicles; generating, by the remote vehicle support apparatus, a display including a plurality of indicators arranged in accordance with the ranking, each indicator of the plurality of indicators representing state data of a respective one of the vehicles, wherein each of the vehicles is assigned to respective remote vehicle support queues based on the ranking, each remote vehicle support queue configured to provide the remote support using respective indicators of assigned vehicles; and in response to a determination that a change in state data indicates that autonomous operation of a first vehicle of the vehicles is operating outside of defined parameter values, interacting with a first indicator of the plurality of indicators representing the first vehicle to transmit instruction data to the first vehicle.

These and other aspects of the present disclosure are disclosed in the following detailed description of the embodiments, the appended claims and the accompanying figures.

BRIEF DESCRIPTION OF THE DRAWINGS

The disclosed technology is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
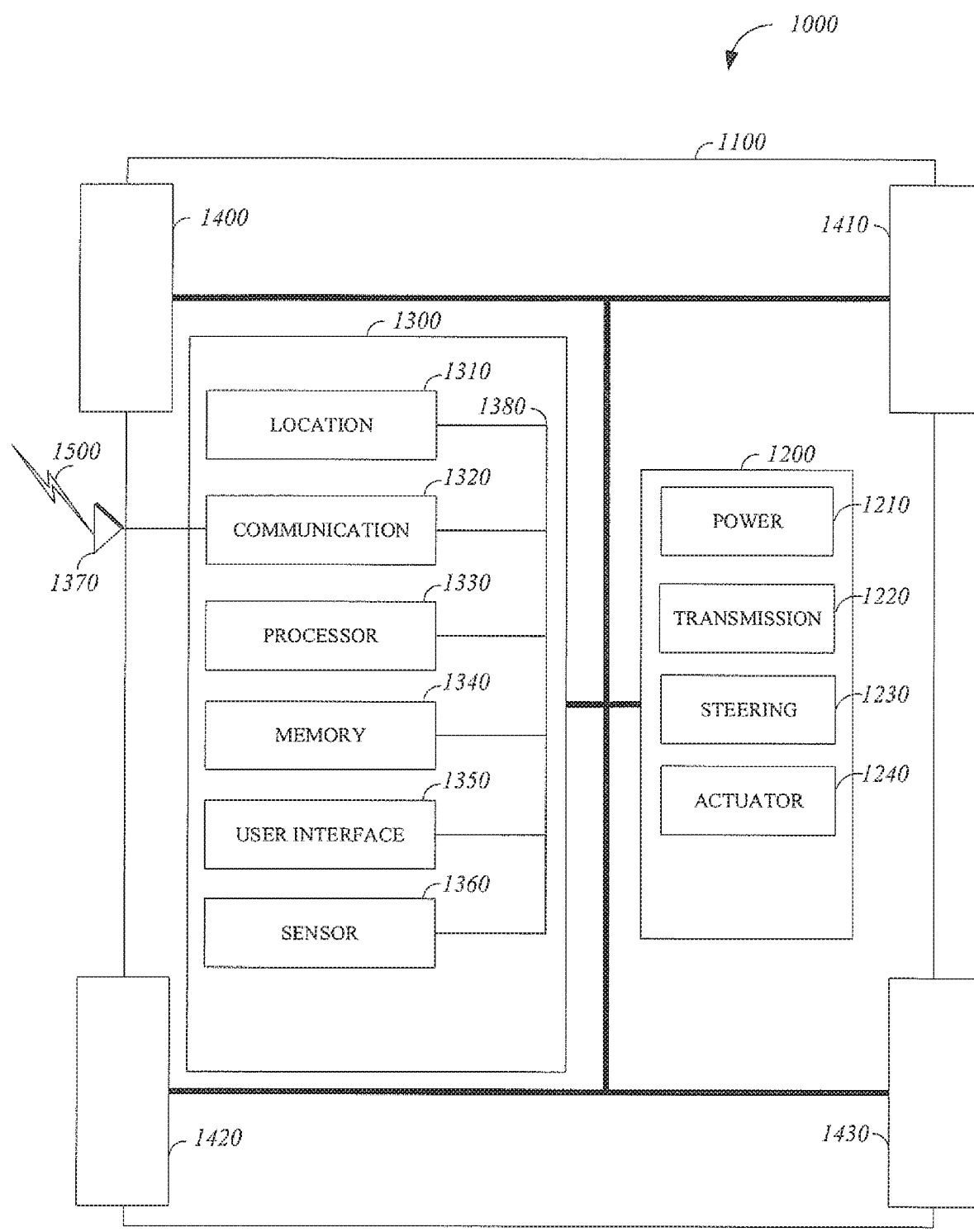
FIG. 1 is a diagram of an example of a portion of a vehicle in which the aspects, features, and elements disclosed herein may be implemented.

The monitoring and operation of large numbers of autonomous vehicles can present challenges that are different from the challenges of monitoring and operating a smaller number of vehicles, or vehicles that are not autonomously operated. With respect to the number of vehicles, a small number of vehicles can be managed by a correspondingly small number of individuals. When the number of vehicles is small, it is often less likely that the vehicles will adversely interact with one another (e.g. form traffic congestion). Further, managing a small number of vehicles as a group will tend to result in lesser gains to vehicle traffic flow efficiency when compared to managing significantly larger groups of vehicles. With respect to the autonomous aspect of the vehicles being monitored, the monitoring and operation of non-autonomous vehicles does not often involve direct control (e.g. tele-operation) of one or more of the vehicles by a human operator. As such, there are fewer control options presented to the non-autonomous operator.

The present disclosure and disclosed technology, provides a more effective interface for monitoring and operating vehicles, including autonomous vehicles, by leveraging a multi-tiered approach that includes customized interfaces for fleet managers, charged with overseeing an entire fleet of autonomous vehicles being monitored by numerous vehicle managers, and the vehicle managers themselves, to whom autonomous vehicles are allocated or assigned for monitoring by a fleet manager and based on data analytics. Further, the disclosed technology provides a way to group autonomous vehicles based on various criteria such as their level of urgency or shared characteristics. In this way, the monitoring and operation management of vehicles is more efficiently distributed, which allows for a more efficient transportation network.

As used herein, the terminology "driver" or "operator" may be used interchangeably. As used herein, the terminology "brake" or "decelerate" may be used interchangeably. As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some implementations, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example," "embodiment," "implementation," "aspect," "feature," or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or." That is, unless specified otherwise, or clear from context, "X includes A or B" is intended to indicate any of the natural inclusive permutations. If X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Implementations of this disclosure provide technological improvements particular to computer networks and autonomous vehicle management, for example, those concerning the extension of computer network components to remotely monitor and tele-operate autonomous vehicles. The development of new ways to monitor autonomous vehicle network resources to, for example, identify system or vehicle impairments and indicate requiring management or attention and communicating instructions or information between the monitoring devices and the vehicles is fundamentally related to autonomous vehicle related computer networks.

Implementations of this disclosure provide at least a system and method for the remote support of autonomous operation of a plurality of vehicles. The system includes a communication system that receives state data from the plurality of vehicles and that transmits instruction data to the plurality of vehicles based on the received state data. Each of the plurality of vehicles includes state data. The system includes a plurality of first level control stations (e.g., vehicle managers) that each display the state data from the plurality of vehicles. In response to a determination that a change in the state data of at least one of the plurality of vehicles indicates that autonomous operation of the at least one of the plurality of vehicles is operating outside of defined parameter values (e.g., a delivery vehicle is delayed in relation to an estimate time of arrival), the first level control station assigned to monitor the at least one of the plurality of vehicles transmits specific instruction data to the at least one of plurality of vehicles through the communication system. The system further includes a second level control station (e.g., fleet manager) associated with the first level control stations that allocates responsibility for the vehicles among the first level control stations. The allocation of responsibility enables the system to balance a work load between the first level control stations or otherwise optimize the functioning and monitoring capabilities of the first level control stations.

U.S. patent application Ser. No. 15/463,242, filed on Mar. 20, 2017, entitled "OBJECT MANAGEMENT DISPLAY," is incorporated herein by reference in its entirety.

To describe some implementations in greater detail, reference is made to the following figures.

FIG. 1 is a diagram of an example of a vehicle 1000 in which the aspects, features, and elements disclosed herein may be implemented. The vehicle 1000 includes a chassis 1100, a powertrain 1200, a controller 1300, wheels 1400/1410/1420/1430, or any other element or combination of elements of a vehicle. Although the vehicle 1000 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1000, which can include accelerating, decelerating, steering, or otherwise controlling the vehicle 1000.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200.

The power source 1210 may be any device or combination of devices operative to provide energy, such as electrical energy, thermal energy, or kinetic energy. For example, the power source 1210 includes an engine, such as an internal combustion engine, an electric motor, or a combination of an internal combustion engine and an electric motor, and is operative to provide kinetic energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1000 from a remote location including the operations center. The instructions for remote operation may be stored in the vehicle 1000 or received from an external source such as a traffic management center, or server computing devices, which may include cloud based server computing devices.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultra violet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short range communications (DSRC) unit, a wireless safety unit (WSU), IEEE 802.11p (Wifi-P), or a combination thereof.

The location unit 1310 may determine geolocation information, including but not limited to longitude, latitude, elevation, direction of travel, or speed, of the vehicle 1000. For example, the location unit includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensor 1360 may include sensors that are operable to obtain information regarding the physical environment surrounding the vehicle 1000. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1000 may include a trajectory controller. For example, the controller 1300 may include a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1000 under control of the transmission 1220, or a steered and propelled wheel that steers and propels the vehicle 1000.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
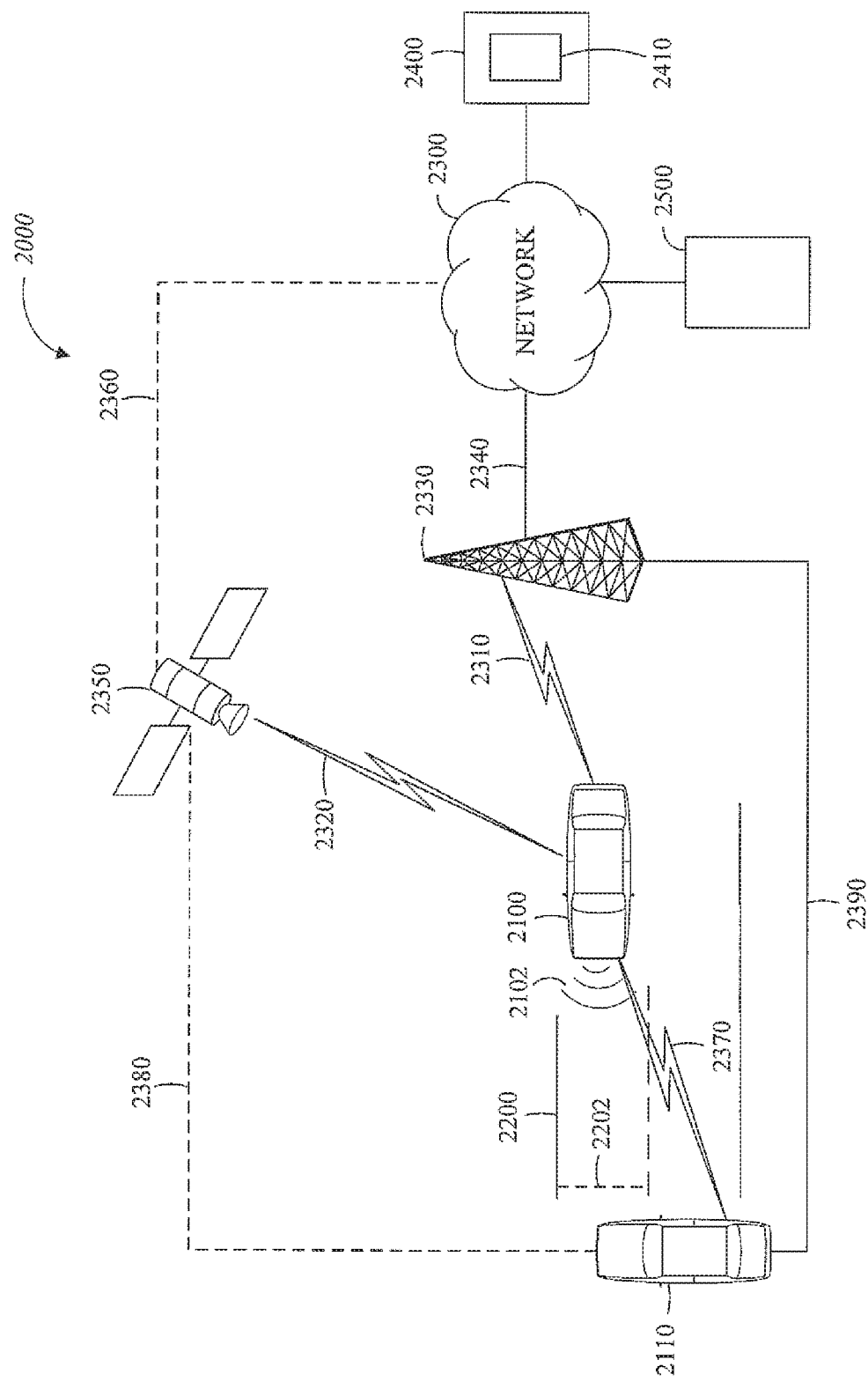
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1000 shown in FIG. 1, and one or more external objects, such as an external object 2110, which can include any form of transportation, such as the vehicle 1000 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple access system that provides for communication, such as voice communication, data communication, video communication, messaging communication, or a combination thereof, between the vehicle 2100, the external object 2110, and an operations center 2400. For example, the vehicle 2100 or the external object 2110 may receive information, such as information representing the transportation network 2200, from the operations center 2400 via the electronic communication network 2300.

The operations center 2400 includes a controller apparatus 2410 which includes some or all of the features of the controller 1300 shown in FIG. 1. The controller apparatus 2410 can monitor and coordinate the movement of vehicles, including autonomous vehicles. The controller apparatus 2410 may monitor the state or condition of vehicles, such as the vehicle 2100, and external objects, such as the external object 2110. The controller apparatus 2410 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the controller apparatus 2410 can establish remote control over one or more vehicles, such as the vehicle 2100, or external objects, such as the external object 2110. In this way, the controller apparatus 2410 may teleoperate the vehicles or external objects from a remote location. The controller apparatus 2410 may exchange (send or receive) state data with vehicles, external objects, or computing devices such as the vehicle 2100, the external object 2110, or a server computing device 2500, via a wireless communication link such as the wireless communication link 2380 or a wired communication link such as the wired communication link 2390.

The server computing device 2500 may include one or more server computing devices which may exchange (send or receive) state signal data with one or more vehicles or computing devices including the vehicle 2100, the external object 2110, or the operations center 2400, via the electronic communication network 2300.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110 may communicate with another vehicle, external object, or the operations center 2400. For example, a host, or subject, vehicle 2100 may receive one or more automated inter-vehicle messages, such as a basic safety message (BSM), from the operations center 2400, via a direct communication link 2370, or via an electronic communication network 2300. For example, operations center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the operations center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the operations center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the operations center 2400 via the electronic communication network 2300, access point 2330, or satellite 2350. The operations center 2400 may include one or more computing devices, which are able to exchange (send or receive) data from: vehicles such as the vehicle 2100; external objects including the external object 2110; or computing devices such as the server computing device 2500.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the operations center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the operations center 2400 via the electronic communication network 2300, the vehicle 2100 (and external object 2110) may communicate with the operations center 2400 via any number of direct or indirect communication links. For example, the vehicle 2100 or external object 2110 may communicate with the operations center 2400 via a direct communication link, such as a Bluetooth communication link. Although, for simplicity, FIG. 2 shows one of the transportation network 2200, and one of the electronic communication network 2300, any number of networks or communication devices may be used.

Figure 3:
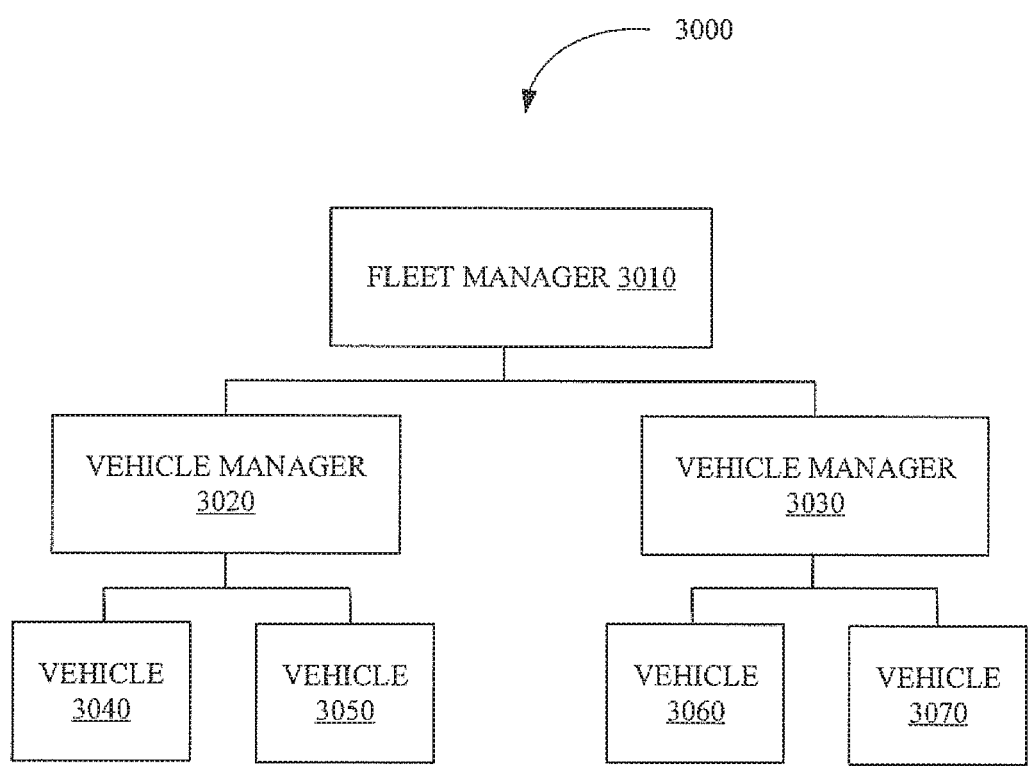
FIG. 3 is a block diagram illustrating a remote vehicle assistance center in accordance with the present disclosure.

FIG. 3 is a block diagram illustrating a remote vehicle assistance center 3000 in accordance with the present disclosure. The remote vehicle assistance center 3000 includes a fleet manager 3010, a plurality of vehicle managers including but not limited to a vehicle manager 3020 and a vehicle manager 3030, and a plurality of vehicles including but not limited to vehicles 3040, 3050, 3060, and 3070.

The fleet manager 3010 can include an apparatus including some or all of the features of the controller 1300 shown in FIG. 1. The fleet manager 3010 can monitor and coordinate vehicle managers, including the vehicle managers 3020/3030 as well as the movement of vehicles, including autonomous vehicles, and the vehicles 3040/3050/3060/3070. Monitoring and coordinating the vehicle managers can include any of: assigning, allocating, or deallocating, vehicles to the vehicle managers; reviewing and monitoring performance data of the vehicle managers; and assigning vehicle managers to a geographic area. In an implementation, there can be multiple fleet managers, who may in turn be managed or under the authority of other fleet managers.

The vehicle manager 3020 can monitor the state or condition of vehicles, including the vehicle 3040 and the vehicle 3050. As illustrated in FIG. 3, the vehicle manager 3020 has been assigned vehicle 3040 and vehicle 3050. The assignment of vehicles to a vehicle manager can be performed by a fleet manager such as the fleet manager 3010.

The vehicle manager 3030 can monitor the state or condition of vehicles, including the vehicle 3060 and the vehicle 3070. As illustrated in FIG. 3, the vehicle manager 3030 has been assigned vehicle 3060 and vehicle 3070. The assignment of vehicles to a vehicle manager can be performed by a fleet manager such as the fleet manager 3010. The assignment of vehicles to a vehicle manager can also be automated using machine learning techniques.

In an implementation, the vehicle managers can cluster or group the vehicles, establish communication with occupants in the vehicle, remotely operate the vehicles, and coordinate the movement of the vehicles through a transportation network or around various obstacles such as traffic congestion. The vehicle managers can interact with other vehicle managers to aid in the monitoring and management of the vehicles.

The vehicles including the vehicle 3040/3050/3060/3070 comprise vehicles such as the vehicle 2100 as shown in FIG. 2, that are being monitored or coordinated by the fleet manager 3010. The vehicles can be operated autonomously or by a human driver and can exchange (send and receive) vehicle data relating to the state or condition of the vehicle and its surroundings including any of: vehicle velocity; vehicle location; vehicle operational state; vehicle destination; vehicle route; vehicle sensor data; external object velocity; and external object location.

Figure 4:
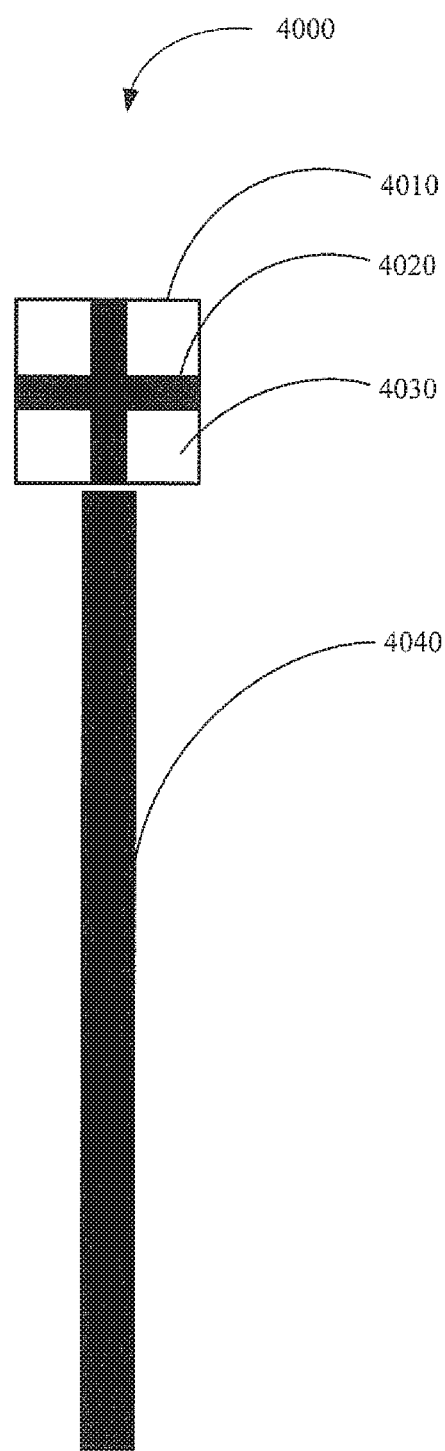
FIG. 4 is a diagram illustrating an example of a vehicle indicator for use in an interface in accordance with the present disclosure.

FIG. 4 is a diagram illustrating an example of a vehicle indicator 4000 for use in an interface in accordance with the present disclosure. In an implementation, the interface is a fleet manager interface. The vehicle indicator 4000 includes a task state indicator 4010, a vehicle mode indicator 4020, a vehicle occupancy indicator 4030, and a temporal state indicator 4040.

The task state indicator 4010 can be used to indicate a task that is being performed by a vehicle or that is assigned to the vehicle including any of: traveling to a pickup destination, including traveling to a destination to pick up one or more passengers or cargo; traveling to a drop-off destination, including traveling to a destination to drop off one or more passengers or cargo; traveling to a maintenance destination, including traveling to a destination at which maintenance or repairs can be performed on the vehicle; and traveling to a refueling destination, including traveling to a destination to refuel the vehicle including petroleum stations or electrical charging stations.

The characteristics of the task state indicator 4010, including the shape and color, can correspond to the task that is being performed by the vehicle. For example, the task state indicator 4010 is shown as a square in FIG. 4, which can indicate, for example, that the vehicle is traveling to a pick up destination. In an implementation, a circular shape of the task state indicator 4010 can indicate that the vehicle is traveling to a drop-off destination. Different shapes and colors can indicate different tasks being performed by the vehicle.

The vehicle mode indicator 4020 can be used to indicate whether the vehicle is operating in any of: an autonomous mode, including a mode in which the vehicle directs itself or the vehicle is being directed remotely by a computing device; a directed mode, including a mode in which a human operator is directing the vehicle from a remote location; a manual mode, including a mode in which a human operator is operating the vehicle from within the vehicle; and a semi-autonomous mode, including a mode in which the vehicle can switch between the autonomous mode and the manual mode based on the state of the vehicle (e.g. assistive braking can activate when a proximity and acceleration threshold is exceeded) and a mode in which the vehicle is simultaneously being controlled using autonomous features and human operation. For example, the vehicle mode indicator 4020 is shown as a cross in FIG. 4, which can indicate, for example, any of the aforementioned modes.

The vehicle occupancy indicator 4030 can be used to indicate any of: whether the vehicle contains one or more passengers; and the state of the passengers in the vehicle. In an implementation, an occupied vehicle is indicated by the vehicle occupancy indicator 4030 being in a filled state (e.g. the area inside the vehicle occupancy indicator 4030 is the same color as the border around the task state indicator 4010).

The characteristics of the vehicle occupancy indicator 4030, including the color, can be used to indicate an issue associated with the vehicle including any of a passenger issue, including a request for assistance from a passenger inside the vehicle, a traffic issue, including issues relating to traffic congestion, traffic accidents, and construction, a decision issue, including issues relating to a decision that can be made by a vehicle manager regarding whether to take control over the vehicle, reroute the vehicle, establish communication with the vehicle, or indicate that an action with respect to the vehicle has been completed, a physical issue with the state of the vehicle, including issues relating to the operational state of the vehicle (e.g. engine state, fuel state). In an implementation, a default color can be used to indicate that the vehicle is operating in a normal state and that no issues with the vehicle are pending.

The temporal state indicator 4040 can be used to indicate the temporal state of the vehicle in relation to an expected or predicted temporal state. In an implementation, the color of the temporal state indicator 4040 can indicate whether the vehicle is ahead of a scheduled time or behind a scheduled time.

The length of the temporal state indicator 4040 can indicate a magnitude of deviation from the expected or predicted temporal state. The length of the temporal state indicator 4040 can be proportional to the magnitude of the deviation from the expected or predicted temporal state (e.g. directly proportional, inversely proportional, exponentially proportional, logarithmic proportionality).

In another implementation, the length of the temporal state indicator 4040 can be disproportionate with respect to the deviation from the expected or predicted temporal state (e.g. a one-third length indicating a less than five-minute deviation, a two-third length indicating a deviation of more than five minutes and less than fifteen minutes, and a full-length indicating a deviation of greater than fifteen minutes). Other characteristics of the temporal state indicator 4040 can be used to indicate the state of the vehicle, for example, a red color could indicate that the vehicle is behind a scheduled time and a green color could indicate that the vehicle is ahead of a scheduled time.

Figure 5:
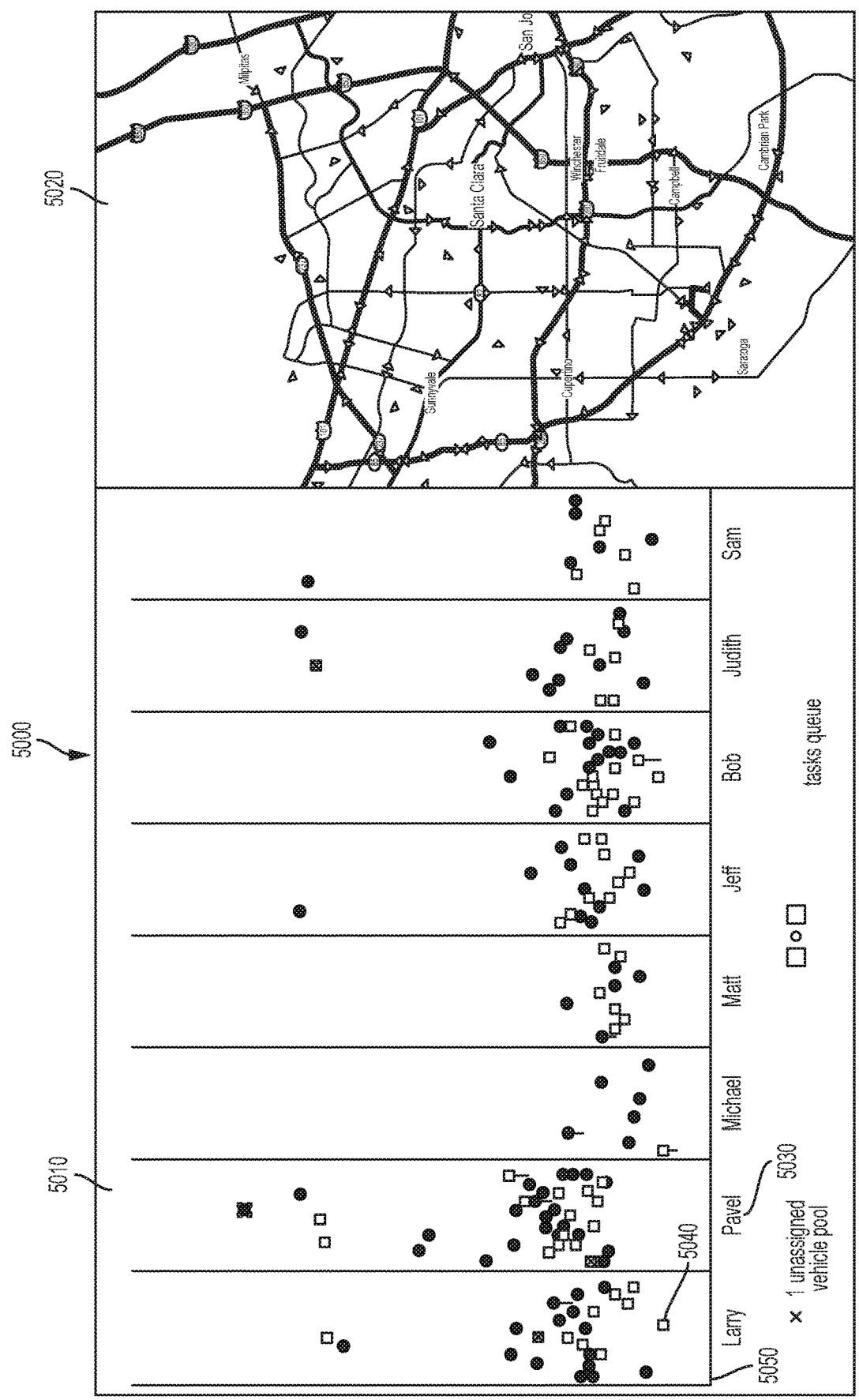
FIG. 5 is a diagram illustrating an example of a fleet manager interface in accordance with the present disclosure.

FIG. 5 is a diagram illustrating an example of a fleet manager interface 5000 in accordance with the present disclosure. The fleet manager interface 5000 can be generated based on one or more instructions that are executable on a computing apparatus, including the controller apparatus 2410 shown in FIG. 2, and which can be stored in a memory of a computing apparatus, including the controller apparatus 2410.

For example, the fleet manager interface 5000 can be generated by the controller apparatus 2410, based on instructions that are interpreted by a client computing device that accesses the controller apparatus 2410 through a computer network. The client computing device can then generate a representation of the fleet manager interface 5000 on a display device.

The fleet manager interface 5000 includes a fleet manager portion 5010, a map portion 5020, a vehicle manager indicator 5030, a vehicle indicator 5040, and a vehicle manager assignment queue 5050, any of which can be based on data associated with the state of physical objects including but not limited to at least one of vehicles, roadways, buildings, and pedestrians.

The fleet manager portion 5010 includes a representation of objects that are being monitored or tracked by the fleet manager and/or the vehicle managers including the association of vehicle managers to vehicles. The objects can include vehicles, including the vehicle 2100 as shown in FIG. 2. The objects can be represented as indicators such as the vehicle indicator 5040, which can be generated as a static image or moving image such as the vehicle indicator 4000 as shown in FIG. 4. Further, the fleet manager portion 5010 can receive input including any of touch inputs, voice inputs, and inputs from an input device. By way of example, vehicle indicators including the vehicle indicator 5040 can be selected by an operator, such as a vehicle manager. Selection of the vehicle indicators can generate data about the state or condition of the respective vehicle represented by the vehicle indicators (e.g. the selected vehicle indicator can indicate whether the vehicle is functioning properly or will arrive at a destination on time).

The map portion 5020 includes a representation of a geographical area including objects within a predefined geographical area. In an implementation, the predefined geographical area can include a geographical area corresponding to the geographical area that includes all or at least some portion of the vehicles that are being monitored by one of the vehicle managers. The objects within the geographical area can include any of the vehicles, and the external objects including roadways, buildings, and pedestrians. The map portion 5020 can receive input including any of touch inputs, voice inputs, and inputs from an input device. The input to the map portion can generate data about the state or condition of the selected vehicles or external objects.

In an implementation, the map portion 5020 contains the same representation of objects that are displayed on the fleet manager portion 5010. In another implementation, the number and type of objects displayed between the fleet manager portion 5010 and the map portion 5020 can differ. For example, the vehicle manager can zoom into a particular geographical area thus displaying only a subset of the objects or vehicles that are represented on the fleet manager portion 5010.

The vehicle manager indicator 5030 is a representation of an identifier for a vehicle manager. Each of the vehicle managers displayed on the fleet manager interface 500 includes a separate vehicle manager indicator. The vehicle manager can be associated with one or more vehicles, which can be distributed or apportioned by the fleet manager or dynamically using machine learning techniques. For example, the fleet manager can modify the number of vehicles assigned to a vehicle manager including any of adding or removing vehicles and transferring one or more vehicles from one vehicle manager to another vehicle manager.

The vehicle indicator 5040 is a representation of the state or condition of an autonomous vehicle, the state including any of a vehicle task, vehicle occupancy, vehicle operational mode (e.g. autonomous operation or manual operation), and a vehicle issue, including but not limited to an issue with the operational state of the vehicle. The vehicle indicator 5040 can include various colors, shapes, patterns, text, pictograms, or any combination thereof, to represent aspects of the state or condition of the vehicle indicator. As an example, the vehicle indicator 5040 can represent an autonomous vehicle that is traveling to a destination in order to pick up a passenger. Further, the vehicle indicator 5040 can represent an autonomous vehicle that is carrying a passenger and traveling to a destination in order to drop the passenger off.

The vehicle manager assignment queue 5050 is a representation of the vehicles that are assigned to a vehicle manager. The vehicles can be assigned to the vehicle manager assignment queue 5050 by the fleet manager or by the vehicle managers themselves or automatically using machine learning techniques. For example, one vehicle manager may realize that they are monitoring too many vehicles and can assign a subset of those vehicles to another vehicle manager that is determined to have additional monitoring capacity. As shown in FIG. 5 the vehicle indicators (e.g., the vehicle indicator 5040) within the vehicle manager assignment queue 5050 are assigned to the vehicle manager associated with the vehicle manager indicator 5030 "Larry." This vehicle manager indicator can represent the real name of the vehicle manager or a username or another identifier.

Figure 6:
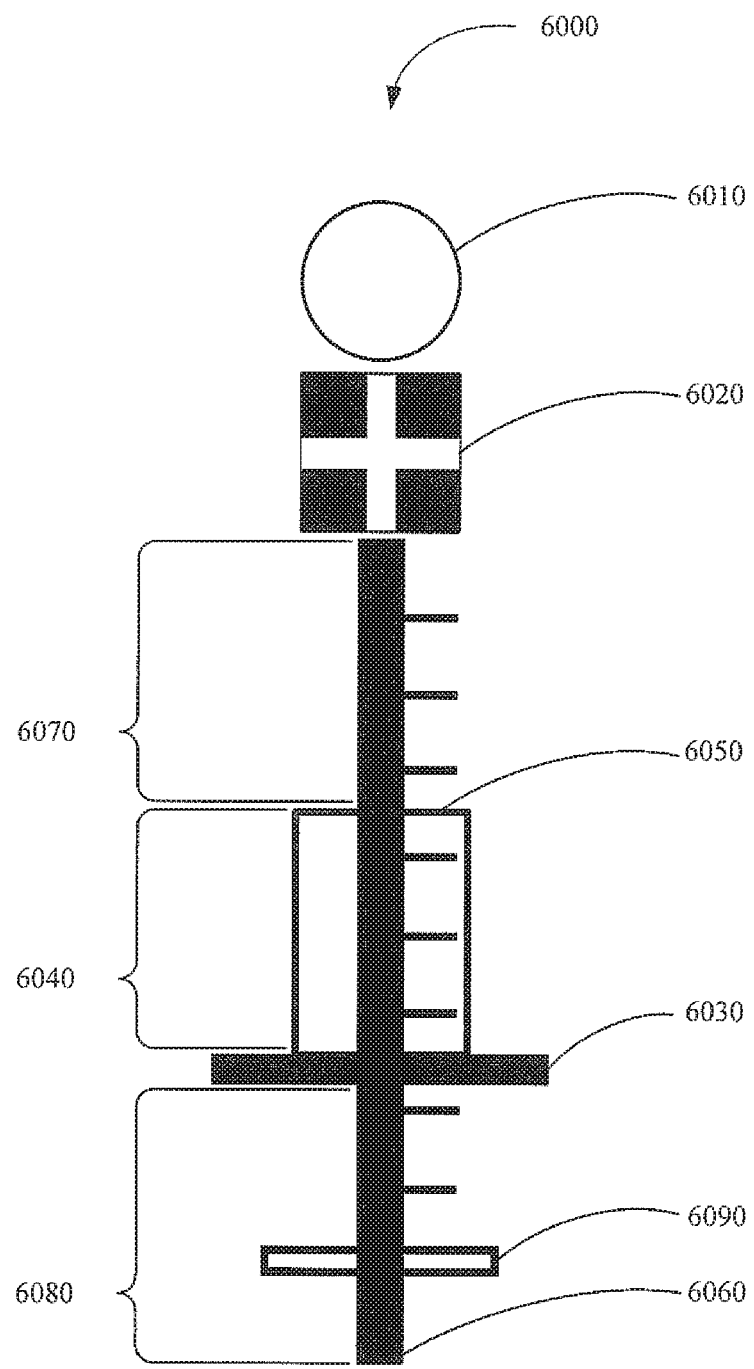
FIG. 6 is a diagram illustrating an example of a vehicle indicator for use in an interface in accordance with the present disclosure.

FIG. 6 is a diagram illustrating an example of a vehicle indicator 6000 for use in an interface in accordance with the present disclosure. In an implementation, the interface is the fleet manager interface 5000 illustrated in FIG. 5, a vehicle manager interface 7000 illustrated in FIG. 7, or a vehicle manager interface 9000 illustrated in FIG. 9.

The vehicle indicator 6000 includes a next task indicator 6010, a current task indicator 6020, an actual progress indicator 6030, a deviation magnitude indicator 6040, an expected progress indicator 6050, a time scale 6060, a time to completion 6070, an elapsed time 6080, and a time compression indicator 6090.

The next task indicator 6010 can be used to indicate a task that is assigned to the vehicle and that is not currently being performed. The next task indicator 6010 can indicate a task that will be performed following performance of a current task (e.g. a current task associated with the current task indicator 6020). For example, the next task indicator 6010 can indicate that a drop off will occur after the current task associated with the current task indicator 6020 is completed. In an implementation, an interaction with the next task indicator 6010 (e.g. selecting the next task indicator 6010) can show a description of the task that will be performed next.

The current task indicator 6020 can be used to indicate a task that is currently being performed by a vehicle. For example, the current task indicator 6020 can include picking up a passenger at a designated location. In an implementation, an interaction with the current task indicator 6020 (e.g. selecting the current task indicator 6020) can show a description of the task that is currently being performed.

The next task indicator 6010 and the current task indicator 6020 can be associated with tasks including but not limited to any of, traveling to a pickup destination, including traveling to a destination to pick up one or more passengers or cargo, traveling to a drop-off destination, including traveling to a destination to drop off one or more passengers or cargo, traveling to a maintenance destination, including traveling to a destination at which maintenance or repairs can be performed on the vehicle; and traveling to a refueling destination, including traveling to a destination to refuel the vehicle including petroleum stations or electrical charging stations.

The shape of the next task indicator 6010 or the current task indicator 6020 can correspond to the task that is being performed by the vehicle. For example, the next task indicator 6010, is shown as a circle in FIG. 6, which indicates that the vehicle is traveling to a drop off destination. The circular shape of the current task indicator 6020 can indicate that the vehicle is traveling to a pick up destination. The shape can include but is not limited to circles, squares, triangles, rectangles, etc.

A pattern (e.g. cross shape, zig-zag) in the next task indicator 6010 or the current task indicator 6020 can indicate whether the vehicle is operating in any of an autonomous mode, including a mode in which the vehicle directs itself or the vehicle is being directed remotely by a computing device, a directed mode, including a mode in which a human operator is directing the vehicle from a remote location, a manual mode, including a mode in which a human operator is operating the vehicle from within the vehicle, and a semi-autonomous mode, including a mode in which the vehicle can switch between the autonomous mode and the manual mode based on the state of the vehicle and a mode in which the vehicle is simultaneously being controlled using autonomous features and human operation. For example, the vehicle mode indicator 4020 is shown as a cross in FIG. 4, which can indicate, for example, any of the aforementioned modes.

The characteristics, including a fill, of the next task indicator 6010 or the current task indicator 6020 can be used to indicate whether the vehicle contains one or more passengers. In an implementation, an occupied vehicle is indicated by the next task indicator 6010 or the current task indicator 6020 being in a filled state. For example, no fill (e.g. no pattern, no shading, and a light color) could be used to indicate that the vehicle does not contain occupants.

The color of the next task indicator 6010 or the current task indicator 6020 can be used to indicate an issue associated with the vehicle including any of a passenger issue, including a request for assistance from a passenger inside the vehicle, a traffic issue, including issues relating to traffic congestion, traffic accidents, and construction, a decision issue, including issues relating to a decision that can be made by a vehicle manager regarding whether to take control over the vehicle, a physical issue with the state of the vehicle, including issues relating to the operational state of the vehicle (e.g. engine state, fuel state). In an implementation, a default color can be used to indicate that the vehicle is operating in a normal state and that no issues with the vehicle are pending.

The actual progress indicator 6030 indicates the actual portion of a route distance that has been traversed, or time that has passed, on the way to a destination. For example, if the progress indicator is at the halfway point of the time scale 6060, half of the route distance has been completed, or half of the estimated travel time has passed.

The expected progress indicator 6050 indicates a portion of a route distance that was estimated to have been completed by the vehicle by the current time and can include a portion of the estimated time to travel to a destination or a portion of the estimated distance that has been traversed by the vehicle. The deviation magnitude indicator 6040 indicates the portion of the route distance or the portion of the travel time by which the expected progress time (indicated by the expected progress indicator 6050) deviates from the actual progress time (indicated by the actual progress indicator 6030).

The time scale 6060 indicates the total travel time or total travel distance to complete a route for the vehicle. For example, if the time scale 6060 is representative of a total travel time of thirty minutes, half of the time scale 6060 is fifteen minutes. In the event that the time scale 6060 is for a longer time period, the time compression indicator 6090 can indicate that a portion of the time scale 6060 that is not proportional to the remaining part of the time scale 6060 has elapsed. For example, the time compression indicator 6090 can indicate that half of the time scale 6060 has elapsed. By way of example, the elapsed time 6080 indicates the travel time that has elapsed on the way to a destination.

Total completion time for a route can be represented by a length of the time scale 6060 which includes the length of the deviation magnitude indicator 6040, the length of the time to completion 6070, and the length of the elapsed time 6080. By way of example, the time to completion 6070 indicates the remaining travel time before the vehicle arrives at the destination or completes the associated/assigned task.

Figure 7:
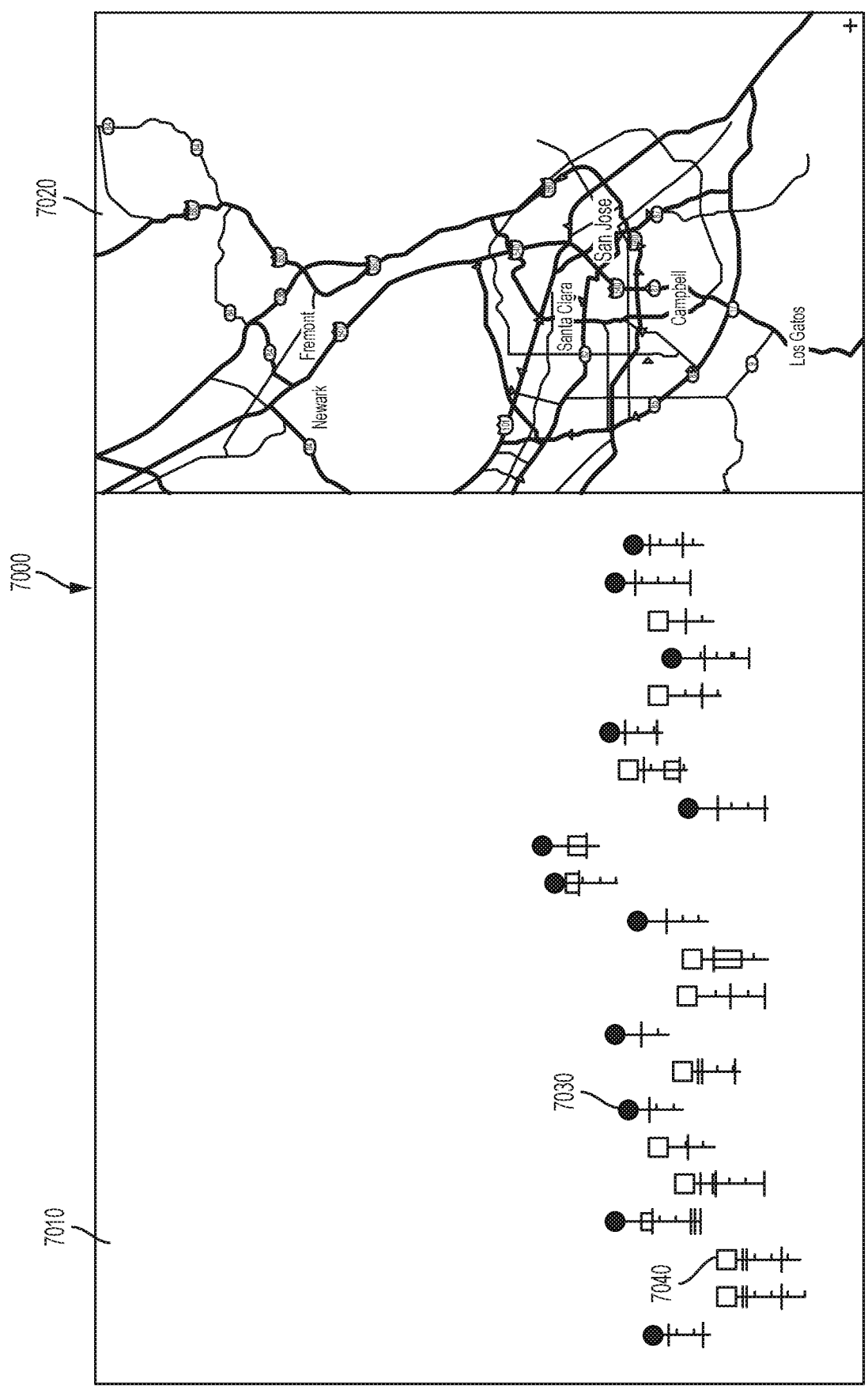
FIG. 7 is a diagram illustrating an example of a vehicle manager interface in accordance with the present disclosure.

FIG. 7 is a diagram illustrating an example of a vehicle manager interface 7000 in accordance with the present disclosure. The vehicle manager interface 7000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 7000 can be generated by the controller apparatus 2410, based on instructions that are interpreted by a client computing device that accesses the controller apparatus 2410 through a computer network. The client computing device can then generate a representation of the vehicle manager interface 7000 on a display device.

The vehicle manager interface 7000 includes a vehicle manager portion 7010, a map portion 7020, a vehicle indicator 7030, and a vehicle indicator 7040, any of which can be based on data associated with the state of physical objects including any of vehicles and external objects including but not limited to pedestrians, cyclists, roadways, and buildings.

The vehicle manager portion 7010 includes a representation of objects that are being monitored or tracked by the vehicle manager utilizing the vehicle manager interface 7000. A plurality of vehicle managers can be monitoring a plurality of vehicles each with their own specific interface. The objects can include vehicles, including the vehicle 2100 shown in FIG. 2. The objects can be represented as indicators such as the vehicle indicator 7030, which can be generated as a variety of images including but not limited to as a static image, a dynamic image, a moving image, a live photo or video feed, or any combination thereof. Further, the vehicle manager portion 7010 can receive input including any of touch inputs, voice inputs, and inputs from an input device.

The map portion 7020 includes a representation of a geographical area including objects within the geographical area. The objects within the geographical area can include any of the vehicles and the external objects including roadways, buildings, cyclists, and pedestrians. In an implementation, the map portion 7020 can have similar or different objects represented as the objects represented by the vehicle manager portion 7010.

The vehicle indicator 7030 and the vehicle indicator 7040 are representations of the state or condition of an autonomous vehicle, including any of a vehicle task, vehicle occupancy, vehicle operational mode (e.g. autonomous operation or manual operation), and a vehicle issue, including but not limited to an issue with the operational state of the vehicle. The vehicle indicator 7030 and the vehicle indicator 7040 can include various colors, shapes, patterns, text, or pictograms, to represent aspects of the state or condition of the autonomous vehicle.

As an example, the vehicle indicator 7030 can represent an autonomous vehicle that is traveling to a destination in order to pick up a passenger. Further, the vehicle indicator 7040 can represent an autonomous vehicle that is carrying another passenger and traveling to a destination in order to drop that passenger off. The different tasks or actions that the respective autonomous vehicles are carrying out result in the graphical display differences between the vehicle indicators 7030 and 7040 (e.g., the vehicle indicator 7030 has a filled in circle and the vehicle indicator 7040 has an unfilled square).

Figure 8:
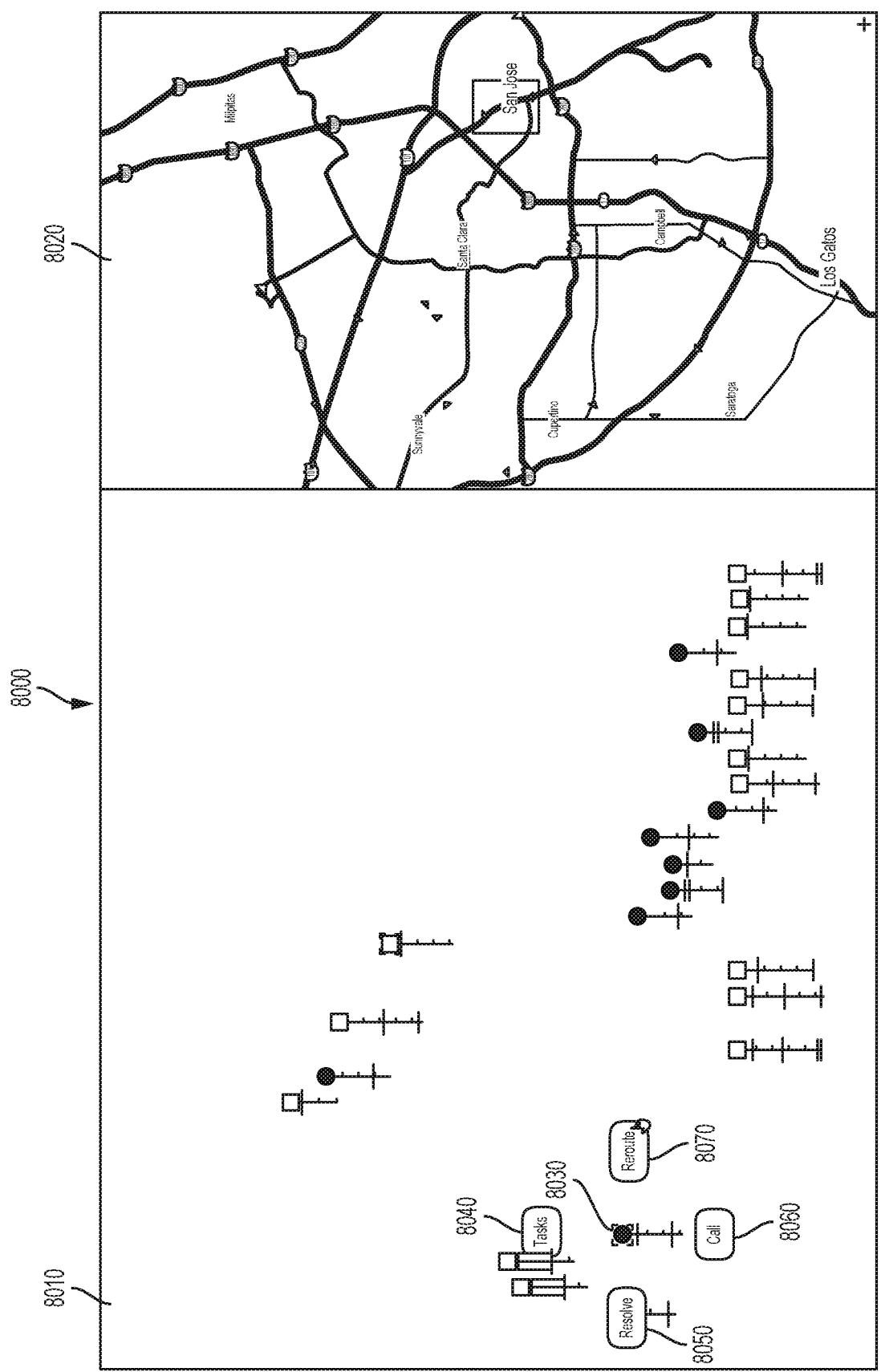
FIG. 8 is a diagram illustrating an example of a vehicle manager interface in accordance with the present disclosure.

FIG. 8 is a diagram illustrating an example of a vehicle manager interface 8000 in accordance with the present disclosure. The vehicle manager interface 8000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 8000 can be generated by the controller apparatus 2410, based on instructions that are interpreted by a client computing device that accesses the controller apparatus 2410 through a computer network. The client computing device can then generate a representation of the vehicle manager interface 8000 on a display device.

The vehicle manager interface 8000 resembles the vehicle manager interface 7000 and includes a vehicle manager portion 8010 (similar to the vehicle manager portion 7010 as shown in FIG. 7), a map portion 8020 (similar to the map portion 7020 as shown in FIG. 7), a vehicle indicator 8030, a task control 8040, a resolved control 8050, a call control 8060, and a reroute control 8070, any of which can be based on data associated with the state of physical objects including but not limited to at least one of vehicles, roadways, buildings, and pedestrians. In another implementation, the vehicle manager interface 8000 includes different control functions other than the task control 8040, the resolved control 8050, the call control 8060, and the reroute control 8070 that enable the vehicle manager to interface with and control various aspects of the respective autonomous vehicle or object being monitored or tracked.

The vehicle manager portion 8010 includes a representation of objects that are being monitored or tracked. The objects can include vehicles, including the vehicle 2100 shown in FIG. 2. The objects can be represented as indicators such as the vehicle indicator 8030, which can be generated as a static image or moving image or a different type of image. Further, the vehicle manager portion 8010 can receive input including any of touch inputs, voice inputs, and inputs from an input device. By way of example, vehicle indicators including the vehicle indicator 8030 can be selected by an operator of the vehicle manager interface 8000, such as a vehicle manager. Selection of the vehicle indicators can generate data about the state or condition of the respective vehicle represented by the vehicle indicators (e.g. the selected vehicle indicator can indicate whether the vehicle will arrive at a destination on time).

The map portion 8020 includes a representation of a geographical area including objects within the geographical area. The objects within the geographical area can include any of the vehicles and the external objects including but not limited to roadways, buildings, cyclists, and pedestrians. The map portion 8020 can receive input including any of touch inputs, voice inputs, and inputs from an input device. The input to the map portion can generate data about the state or condition of the selected vehicles or external objects. In an implementation, the map portion 8020 can have similar or different objects represented as the objects represented by the vehicle manager portion 8010.

For example, selecting a building, such as a stadium, could generate data indicating that a sporting event is taking place at the stadium within a certain time frame. Accordingly, the vehicle manager, can anticipate congestion in the vicinity of the stadium at the conclusion of the sporting event, due to the increased traffic flow resulting from patrons leaving the stadium. Therefore, the vehicle manager can reroute or change the completion time of one of the autonomous vehicles that they are monitoring and that is scheduled to carry out a specific task near the stadium at the conclusion of the sporting event.

The vehicle indicator 8030 includes a representation of the state or condition of a vehicle (e.g. an autonomous vehicle or a human driven vehicle) and includes any of a vehicle task, vehicle occupancy, vehicle operational mode (e.g. autonomous operation or manual operation), and a vehicle issue, including but not limited to an issue with the operational state of the vehicle. The vehicle indicator 8030 can include various characteristics including colors, shapes, patterns, text, or pictograms, to represent aspects of the state or condition of the vehicle indicator. As an example, the vehicle indicator 8030 can represent an autonomous vehicle that is traveling to a destination in order to pick up a passenger. Or the vehicle indicator 8030 can represent an autonomous vehicle that is carrying a passenger and traveling to a destination in order to drop the passenger off.

Any of the task control 8040, the resolved control 8050, the call control 8060, and the reroute control 8070, can be controlled or modified based on an input including any of a user input based on an input received through an input device including a tactile input device (e.g. a keyboard, mouse, or touchscreen), an audio input device (e.g. a microphone), and a visual input device (e.g. a camera). Moreover, any of the task control 8040, the task resolved control 8050, the call control 8060, and the reroute control 8070, can be controlled or modified based on instructions, such as computer program instructions (e.g. instructions to select vehicle indicators that meet pre-established criteria such as a common destination).

The task control 8040 can be used to modify the task that is associated with a vehicle. For example, the vehicle associated with the vehicle indicator 8030 may have completed a drop off. A vehicle manager can interact with the task control 8040 and modify the vehicle task to indicate that the vehicle should now pick up a passenger instead of completing a previously assigned next task. The task can be modified and/or updated while the task completion is in progress or in regards to an upcoming task. For example, the current task can be set for delivery of a package at a certain time but based on traffic conditions, the current task is updated to pick up a passenger nearby and drop them off at a location that isn't within the traffic congestion area. In another example, one of the upcoming tasks of the vehicle can be modified/updated/deleted while the vehicle is completing a current unrelated task.

The resolved control 8050 can be used to indicate that an issued related to the vehicle has been resolved or completed by the vehicle manager. For example, after a vehicle manager receives a help request from a vehicle associated with the vehicle indicator 8030 or a passenger of the vehicle, and provides assistance to the vehicle, the resolved control 8050 can be activated by the vehicle manager to indicate that the issue has been resolved and is no longer pending. In an implementation, activating the resolved control 8050 can modify vehicle data associated with the vehicle including a vehicle task urgency that includes an indication of the urgency of a vehicle request or a vehicle task (e.g. an ambulance carrying a patient to a hospital). For example, a vehicle carrying a patient in urgent need of medical help, could send a request to a vehicle manager for an optimized rerouting and once the vehicle manager takes care of this request or concludes that additional help is needed, the vehicle manager can interact with the resolved control 8050 to update the status of the request.

The call control 8060 can used to contact and communicate with the vehicle associated with the vehicle indicator 8030. For example, when the call control 8060 is activated, a vehicle manager can interact with an occupant or passenger of the vehicle associated with the vehicle indicator 8030. In an implementation, when the call control 8060 is activated, any of an audio connection or an audio and video connection (e.g., live video communication feeds) can be established with the vehicle associated with the vehicle indicator 8030.

Figure 9:
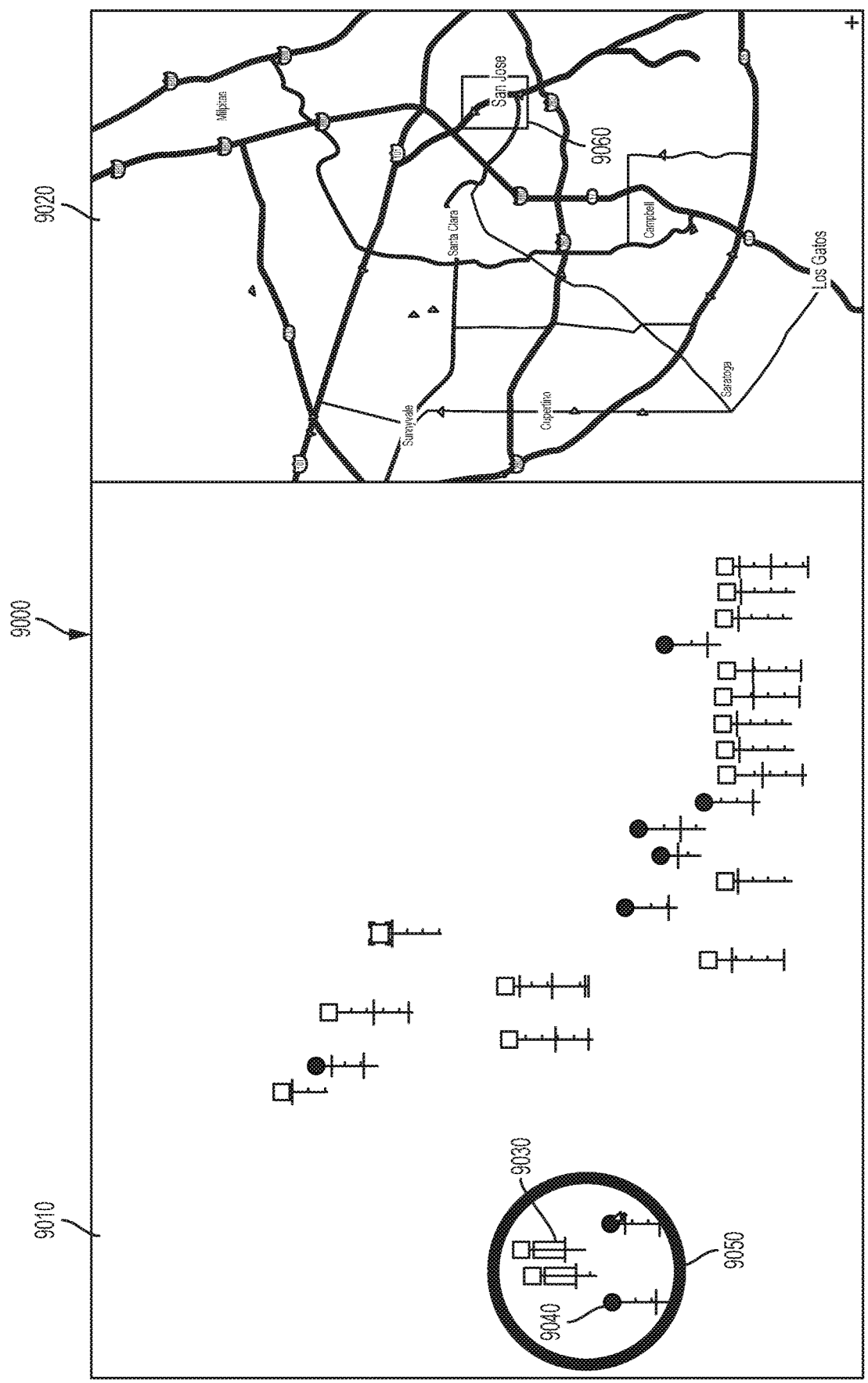
FIG. 9 is a diagram illustrating an example of a vehicle manager interface in accordance with the present disclosure.

The reroute control 8070 can be used to modify a route associated with a vehicle. For example, the vehicle associated with the vehicle indicator 8030 could be in transit to a destination via a route that will pass through heavily congested traffic. The reroute control 8070 could be used to reroute the vehicle to avoid entering the area with the heavily congested traffic. In another implementation, the reroute control 8070 can be a different type of control that provides tele-operation of autonomous vehicles FIG. 9 is a diagram illustrating an example of a vehicle manager interface 9000 in accordance with the present disclosure. The vehicle manager interface 9000 can be generated based on one or more instructions that are executable on a computing apparatus, including the controller apparatus 2410, and which can be stored in a memory of a computing apparatus, including the controller apparatus 2410.

For example, the vehicle manager interface 9000 can be generated by the controller apparatus 2410, based on instructions that are interpreted by a client computing device that accesses the controller apparatus 2410 through a computer network. The client computing device can then generate a representation of the vehicle manager interface 9000 on a display device.

The vehicle manager interface 9000 resembles the vehicle manager interface 8000 as shown in FIG. 8 and includes a vehicle manager portion 9010, a map portion 9020, a vehicle indicator 9030, a vehicle indicator 9040, a cluster control 9050, and an area selection control 9060, any of which can be based on data associated with the state of physical objects including but not limited to at least one of vehicles, roadways, buildings, and pedestrians.

The vehicle manager portion 9010 includes a representation of objects that are being monitored or tracked. The objects can include vehicles, including the vehicle 2100 shown in FIG. 2. The objects can be represented as indicators such as the vehicle indicator 9030, which can be generated as a static image or moving image or any other type of image. Further, the vehicle manager portion 9010 can receive input including any of touch inputs, voice inputs, and inputs from an input device.

By way of example, vehicle indicators including the vehicle indicator 9030 and the vehicle indicator 9040 can be selected by an operator, such as a vehicle manager. Selection of the vehicle indicators can generate data about the state or condition of the respective vehicle represented by the vehicle indicators (e.g. the selected vehicle indicator can indicate whether the vehicle will arrive at a destination on time).

The map portion 9020 includes a representation of a geographical area including objects within the geographical area. The objects within the geographical area can include any of the vehicles, and the external objects including but not limited to roadways, buildings, cyclists and pedestrians. The map portion 9020 can receive input including any of touch inputs, voice inputs, and inputs from an input device. The input to the map portion can generate data about the state or condition of the selected vehicles or external objects. For example, selecting a building, such as a stadium, could generate data indicating that a sporting event is taking place at the stadium within a certain time frame. Accordingly, the vehicle manager, can anticipate congestion in the vicinity of the stadium at the conclusion of the sporting event, due to the increased traffic flow resulting from patrons leaving the stadium and reroute the vehicle.

The vehicle indicator 9030 and the vehicle indicator 9040 are representations of the state or condition of two separate autonomous vehicles, including any of a vehicle task, vehicle occupancy, vehicle operational mode (e.g. autonomous operation or manual operation), and a vehicle issue, including an issue with the operational state of the vehicle. The vehicle indicator 9030 and the vehicle indicator 9040 can include various colors, shapes, patterns, text, or pictograms, to represent aspects of the state or condition of the vehicle indicator. As an example, the vehicle indicator 9030 can represent an autonomous vehicle that is traveling to a destination in order to pick up a passenger. Further, the vehicle indicator 9040 can represent an autonomous vehicle that is carrying another passenger and traveling to a destination in order to drop that passenger off.

The cluster control 9050 and the area selection control 9060 include a control element that can be controlled or modified based on an input including any of a user input based on an input received through an input device including a tactile input device (e.g. a keyboard, mouse, or touchscreen), an audio input device (e.g. a microphone), and a visual input device (e.g. a camera). Moreover, the cluster control 9050 and the area selection control 9060 element can be controlled or modified based on instructions, such as computer program instructions (e.g. instructions to select vehicle indicators that meet pre-established criteria such as a common destination).

The area selection control 9060 is a control element that can be controlled or modified to select a section of the map portion 9020. For example, a rectangular section of the map can be selected or highlighted by the vehicle manager in order to define that the vehicles within the geographical area of the map will be monitored and selected or clustered on the vehicle manager portion 9010 that corresponds to the selected part of the map portion 9020. The objects within the selected section of the map portion 9020 can be monitored and organized according to a cluster criteria including any of routes, destinations, and points of departure in common. As illustrated in FIG. 9, the cluster control 9050 can indicate that the vehicle indication 9030 and vehicle indication 9040 are part of a cluster group based on shared cluster criteria (e.g., they share similar routes).

Figure 10:
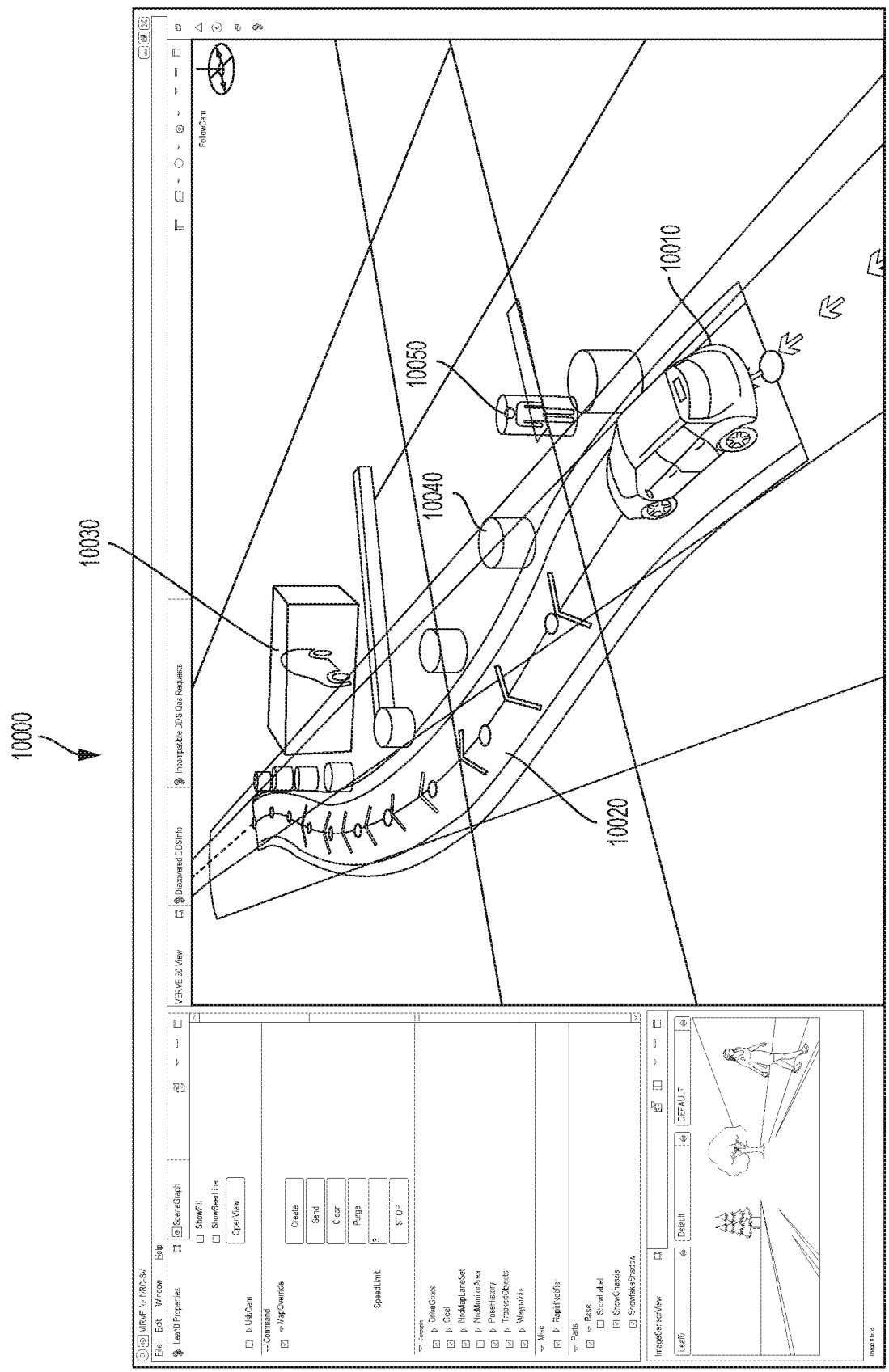
FIG. 10 is a diagram illustrating an example of a vehicle manager interface in accordance with the present disclosure.

FIG. 10 is a diagram illustrating an example of a vehicle manager interface 10000 in accordance with the present disclosure. The vehicle manager interface 10000 can be generated based on one or more instructions that are executable on a computing apparatus, including the controller apparatus 2410 as shown in FIG. 2, and which can be stored in a memory of a computing apparatus, including the controller apparatus 2410.

For example, the vehicle manager interface 10000 can be generated by the controller apparatus 2410, based on instructions that are interpreted by a client computing device that accesses the controller apparatus 2410 through a computer network. The client computing device can then generate a representation of the vehicle manager interface 10000 on a display device.

The vehicle manager interface 10000 includes a vehicle indicator 10010, a path indicator 10020, an external object indicator 10030, an obstruction indicator 10040, a pedestrian indicator 10050, any of which can be based on data associated with the state of physical objects including but not limited to at least one of vehicles, roadways, buildings, and pedestrians. A plurality of configurations of external objects, obstructions, pedestrians, and any combination thereof can be displayed on the vehicle manager interface 10000. The vehicle indicator 10010 can be used to represent a vehicle. In this example, the vehicle is represented as a three dimensional model, however the vehicle indicator 10010 can be represented in different ways including any of a two dimensional image and a pictogram, such as an icon.

The path indicator 10020 can be used to represent a path between the current vehicle location and a vehicle destination. In an implementation, a vehicle manager can guide the vehicle associated with the vehicle indicator 10010 along the path indicated by the path indicator 10020. For example, when providing remote assistance to a vehicle associated with the vehicle indicator 10010, a path indicator such as a virtual lane can be generated in order to provide a visual representation of the path that the vehicle can travel on that is illustrated by the path indicator 10020.

The external object indicator 10030 can be used to represent external objects such as other vehicles that could change the intended route of the vehicle as an example. The obstruction indicator 10040 can be used to represent external objects that can obstruct the movement of the vehicle represented by the vehicle indicator 10010. The pedestrian indicator 10050 can be used to represent an external object including a pedestrian or a cyclist or another moving object. The pedestrian indicator 10050 can be indicated with a distinctive color scheme that is different from other external objects represented by the external object indicator 10030 or the obstruction indicator 10040. In this way, pedestrians can be distinguished from other types of external objects to provide additional awareness and avoidance capabilities. In an implementation, the external object indicator 10030, the obstruction indicator 10040, and the pedestrian indicator 10050, or any combination thereof, can be represented by the same or similar type of indicator that covers all objects that could affect at least one parameter (e.g., route, travel time, etc.) of the vehicle represented by the vehicle indicator 10010.

The steps, or operations, of any method, process, or algorithm described in connection with the implementations of the disclosed technology herein, may be implemented in hardware, firmware, software executed by hardware, circuitry, or any combination thereof. To facilitate explanation, the processes 11000-14000, shown in FIGS. 11-14, are depicted and described as a series of operations. However, the operations in accordance with this disclosure can occur in various orders or concurrently. Additionally, operations in accordance with this disclosure may occur with other operations not presented and described herein.

Figure 11:
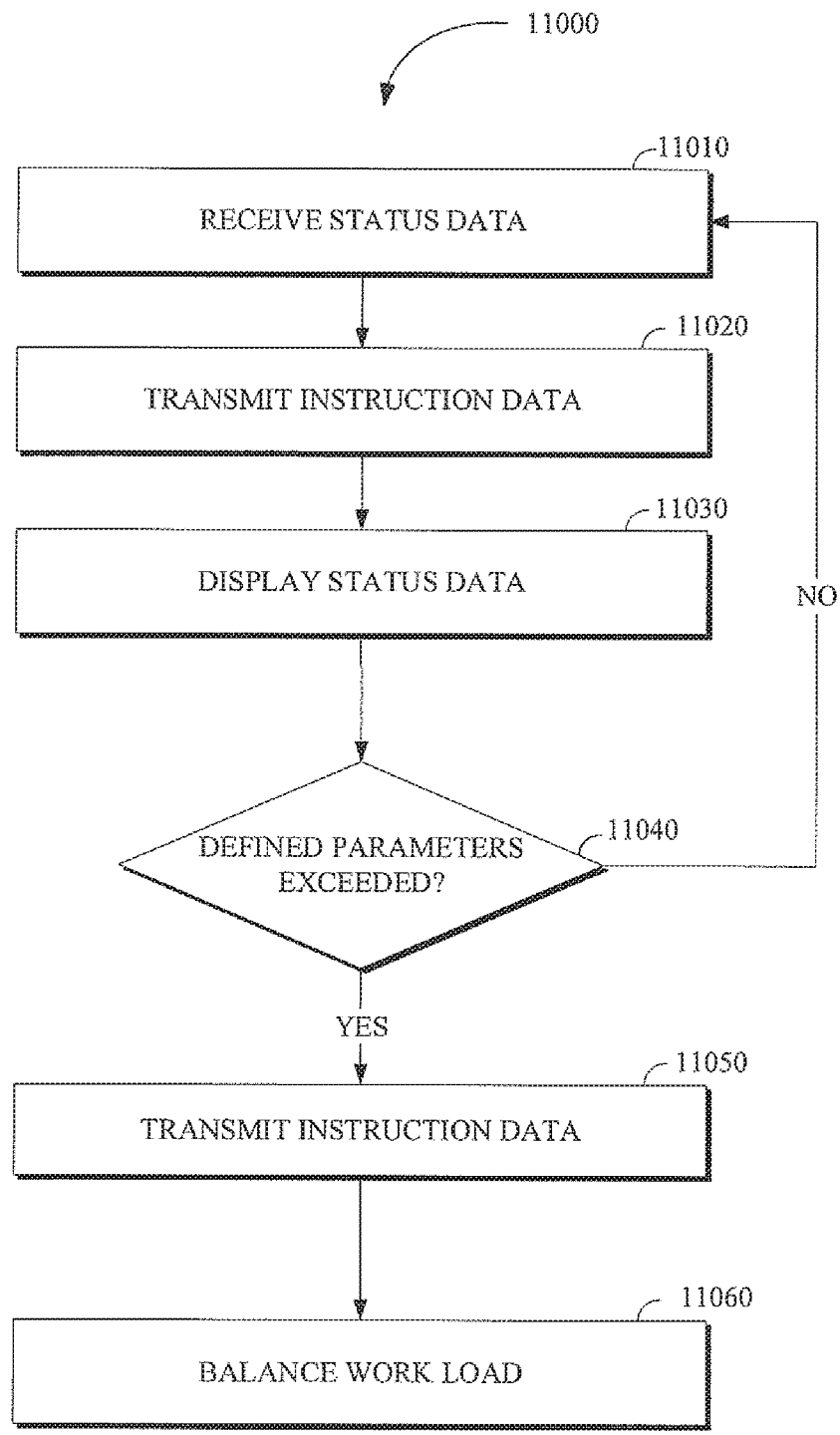
FIG. 11 is a flow chart of a technique for remote support in accordance with the present disclosure.

FIG. 11 is a flow chart of a technique 11000 for remote support in accordance with the present disclosure. In an implementation, the technique 11000 is utilized by a vehicle monitoring system or remote support system that includes any of a fleet manager, vehicle manager, and the aforementioned interfaces. Some or all aspects of the technique 11000 for remote support may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 11000 for remote support can be implemented in a system combining some or all of the features described in this disclosure.

At operation 11010, status or state data is received from one or more of the vehicles. In an implementation, the state data is received by a communication system or similar device of the vehicle monitoring system. The one or more vehicles can include a device or apparatus (e.g. a conveyance) that is used to transport objects including any of one or more passengers and cargo. The one or more vehicles can include any of an autonomous vehicle or a vehicle that is driven by a human driver or a semi-autonomous vehicle.

The state data includes but is not limited to data that indicates the state or condition of the vehicles, including any of kinetic state data relating to any of the velocity and acceleration of a vehicle, location data, including the geographical location of a vehicle (e.g. the latitude and longitude of the vehicle) or the location of the vehicle with respect to another object, vehicle position, including the orientation and inclination (e.g. slope of the vehicle on an incline) of the vehicle, the operational state of the vehicle, including the electrical state or mechanical state of the vehicle (e.g. health of the electrical vehicle systems, mechanical vehicle systems, tire pressure, etc.), maintenance data related to maintenance of the vehicle, energy source data including an amount of fuel remaining or an amount of battery charge remaining, sensor data based on outputs from sensors including, optical sensors, audio sensors, an motion sensors, internal state data, including a temperature and humidity inside the passenger cabin of the vehicle, and a current task (e.g., pick up a passenger) of the vehicle.

At operation 11020, in response to receiving and processing the state data, the communication system transmits instruction data to the vehicles, including a first vehicle. The instruction data includes but is not limited to instructions to be performed by the vehicle (e.g. the autonomous vehicle) or an occupant of the vehicle (e.g. a driver). The instruction data can include data associated with any of controlling movement of a vehicle, including changing the acceleration, velocity, or direction (e.g. steering), of the vehicle, activating or deactivating (e.g. turning some or all parts of the vehicle on or off) a control system in the vehicle, including mechanical control systems and electrical control systems, activating or deactivating sensors in the vehicle (e.g. activating a camera to view the interior of the vehicle or an area outside the vehicle), activating or deactivating a communication system including any of internal communication systems (e.g. internal speakers directed at vehicle occupants) and external communication systems (e.g. external speakers directed at objects or individuals outside of the vehicle).

In an implementation, transmitting the instruction data to a vehicle, such as the first vehicle, comprises transmitting driving route data for implementation by an autonomous device or system of the vehicle. The driving route data can include instructions to modify an existing driving route for the vehicle. For example, transmitting the driving route data can be associated with satisfaction of a condition including a change in the state data (e.g. transmitting the driving route can occur when a threshold level of traffic congestion is determined to be occurring on the existing driving route).

In another implementation, transmitting the instruction data to an autonomous vehicle, such as the first vehicle, can be associated with ignoring at least one operating constraint of the autonomous operation to allow the first vehicle to traverse the driving route. As an example, autonomous operation of a vehicle can include operating constraints that prohibit certain types of actions by the vehicle, including any of violating a speed limit, including driving too rapidly or driving too slowly, violating a traffic regulation, including driving in the opposite direction of traffic, and driving away from a road surface. By ignoring an operating constraint, a vehicle is able to perform prohibited actions in accordance with instructions in the instruction data. For example, circumventing a construction zone could include driving in a portion of the roadway that was previously restricted such as when the portion of the roadway isn't a paved road surface and is instead a dirt road.

At operation 11030, the state data from the vehicles is generated and displayed on an interface of the vehicle monitoring system. The state data can be generated as or converted into state data indicators associated with the state data. The state data indicators can be displayed on control stations including first level control stations (e.g., fleet manager control stations which can include fleet manager interfaces) or on second level control stations (e.g., vehicle manager control stations which can include vehicle manager interfaces). As an example, the first level control stations can include computing apparatuses or computing devices that generate the state data on a display device including a monitor, television, or other device that can display images. Further, the state data indicators can be output to a display such as the fleet manager interface 5000 illustrated in FIG. 5.

At operation 11040, one of the first level control stations, determines whether a change in the state data indicates that the autonomous operation of the first vehicle is operating outside of (e.g., exceeds) defined parameter value values. The defined parameter values include any of one or more states or conditions of the state data that are defined as being within a predetermined range or within the values of a predetermined threshold. For example, the energy source data in the state data can indicate that the vehicle fuel tank has a small amount of petroleum/fuel or that most of the fuel has been expended or is below a threshold parameter value for fuel level (e.g. the available fuel value for the defined parameter value for available fuel indicates that the vehicle is operating outside of the defined available fuel parameter value).

Responsive to a determination that the state data indicates that the autonomous operation of the first vehicle is operating outside the defined parameter values, the process 11000 proceeds to operation 11050. Responsive to a determination that the state data indicates that the autonomous operation of the first vehicle is operating within the defined parameter values, the process 11000 returns to operation 11010.

In an implementation, a route deviation value can be generated based on a comparison of the location data and the kinetic state data of the first vehicle. The determination of whether the autonomous operation of the first vehicle is operating outside of the defined parameter values can be based on a comparison of the route deviation value to a deviation threshold. For example, the state data can include route data that indicates a route and destination for a vehicle. By comparing a route deviation value (indicating the extent to which the position of the vehicle deviates from the route) to a deviation threshold it can be determined whether the autonomous operation of a vehicle, including the first vehicle, is operating outside of defined parameter values.

At operation 11050, a different set of instruction data is transmitted to one or more vehicles including the first vehicle. The different set of instruction data can be output as instructions through a communication system in the vehicle. For example, the instructions can be output in any of a visual output, including text or images generated on a display device (e.g. a video display), an audible output, including sounds or words generated through a speaker system, and a tactile output, including vibrations generated through a portion of the vehicle, including a portion of the vehicle that is accessible to a vehicle occupant. The different set of instruction data is transmitted in response to the determination made in operation 11040 wherein a condition or defined parameter values are analyzed.

At operation 11060, a control station, such as a second level control station (e.g., a fleet manager) associated with, or coupled to, the first level control stations (e.g., vehicle managers), distributes the monitoring and control over the vehicles to the first level control stations. By distributing the monitoring and control of the vehicles to multiple first level control stations, the work load among the vehicle manager control stations can be balanced. For example, a fleet manager might notice that between two vehicle managers, a first one of the two vehicle managers is monitoring five vehicles and the other one of the two vehicle managers is only monitoring one vehicle. As a result, the fleet manager can reassign a couple of the vehicles from the first to the other one of the two vehicle managers. By balancing the vehicle workload in the control stations (or remote vehicle support queues), the computing resources in the vehicle monitoring system (or the remote vehicle support apparatus) can be more effectively utilized.

Figure 12:
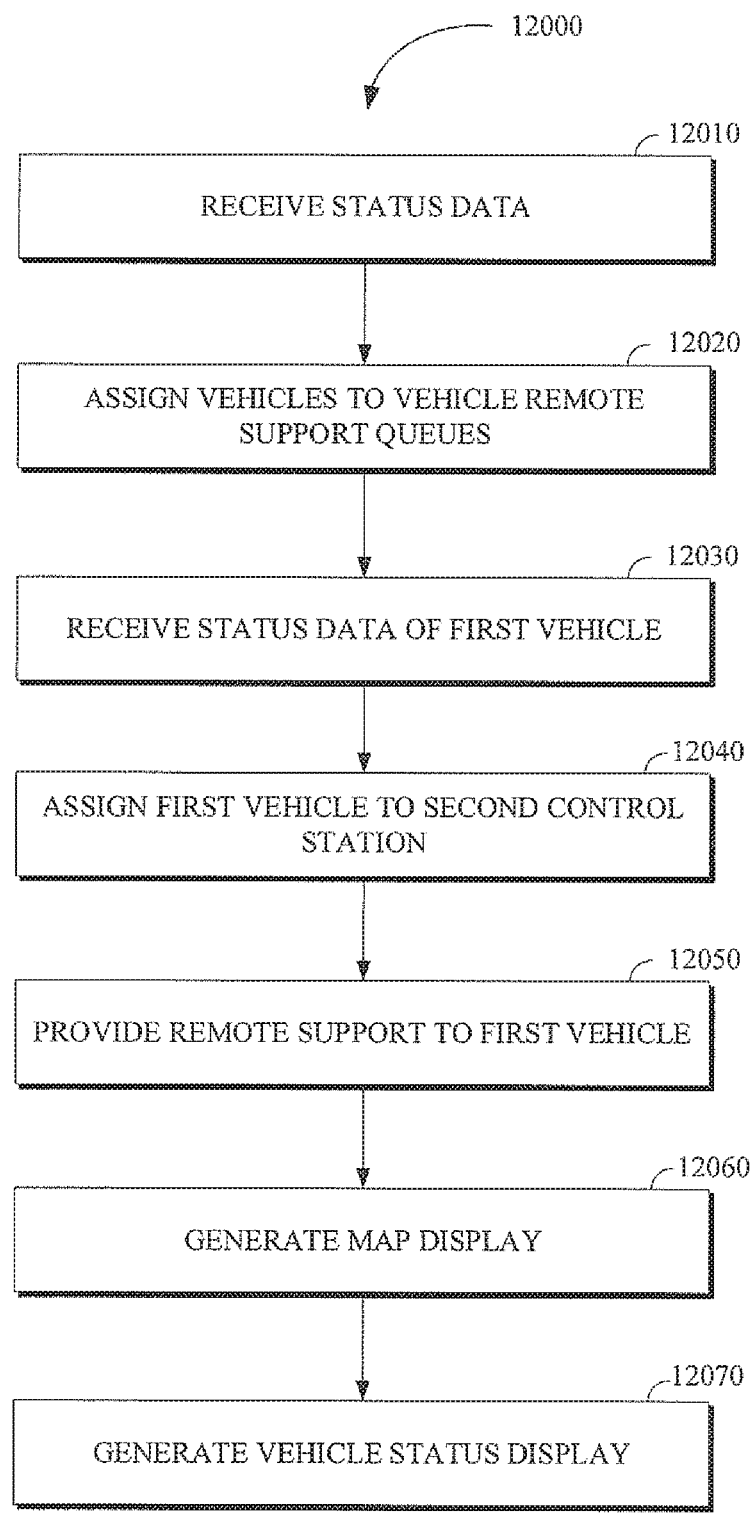
FIG. 12 is a flow chart of a technique for remote support of autonomous vehicles in accordance with the present disclosure.

FIG. 12 is a flow chart of a technique 12000 for remote support of autonomous vehicles according to the present disclosure. The process 12000 is utilized by a vehicle monitoring system such as a remote vehicle support apparatus. Some or all aspects of the technique 12000 for remote support may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the process 12000 for remote support can be implemented in a system combining some or all of the features described in this disclosure.

At operation 12010, state data for a plurality of vehicles (e.g., autonomous vehicles) is received by the remote vehicle support apparatus. The state data can indicate respective current states (e.g., status information) and data for each of the plurality of vehicles. In other words, each vehicle has its own state data that can be received by the remote vehicle support apparatus. In an implementation, the remote vehicle support apparatus includes a plurality of remote vehicle support queues that comprise respective control stations and that are managed or monitored by vehicle managers. Each control station can receive the state data for one or more different vehicles of the plurality of vehicles that have been assigned to the respective control system (e.g., by the fleet manager).

At operation 12020, the plurality of vehicles are each assigned to respective remote vehicle support queues based on the state data. The assignment can be performed by the remote vehicle support apparatus or a fleet manager of the remote vehicle support apparatus. Assigning the vehicles to the remote vehicle support queues can include assigning one or more of the plurality of vehicles based on a comparison of a portion of the state data to assignment criteria to determine inclusion of the vehicle in the respective remote vehicle support queue. For example, the state data for the vehicles could include an indication of the destination of the vehicles. Accordingly, vehicles with the same destination could be assigned to the same queue, in which, for example, the vehicles could be monitored and managed (including remote operation) by the same vehicle manager assigned to the remote vehicle support queue.

At operation 12030, an indication from a first vehicle of the plurality of vehicles is received by the remote vehicle support apparatus. The indication can include an indication that the first vehicle is requesting remote support. For example, the indication can include any of a communication from an occupant of the first vehicle and an indication signal including the state or status data of the first vehicle at a time period relative to the time of the request. For example, the state data in the indication signal can be used to determine the identity, location, and state of the first vehicle associated with the remote support request and the condition of the first vehicle when the request was made.

At operation 12040, after receiving the indication via operation 12030 and before providing the remote support to the first vehicle via operation 12050, the first vehicle can be optionally assigned from one control station to another control station based on the ability of the one control station to resolve the request received via operation 12030. For example, a vehicle (such as the first vehicle) can be assigned from a first control station to a second control station (of a plurality of control stations) responsive to a change in the state data for any of the plurality of vehicles (including state data of the first vehicle). The change in the state data for any of the plurality of vehicles can be based an input to the remote vehicle support apparatus including a display of the state data for each of the plurality of vehicles assigned to the first control station and each of the plurality of vehicles assigned to the second control station.

For example, based on a vehicle manager interacting with a portion of a touchscreen display, including inputting an indication that a task (e.g. a drop off) has been completed or is no longer needed, the vehicle can be assigned to lower priority control station. In another example, if a vehicle manager is assigned an increasing number of high priority vehicles and associated tasks, some of those vehicles can be reassigned to another vehicle manager that isn't monitoring as many high priority vehicles and thus has the additional resources to do so.

At operation 12050, the remote support is provided a vehicle, such as the first vehicle. The remote support can be provided through a communications link of the remote vehicle support apparatus by transmitting instruction data to modify the autonomous operation of the vehicle. In an implementation, the instruction data may be provided from a remote vehicle support queue that includes the first vehicle. For example, the remote support to the vehicle can be provided by a vehicle manager assigned to the remote vehicle support queue that includes the vehicle and that is assigned for monitoring by the vehicle manager.

At operation 12060, a map display is generated by the remote vehicle support apparatus. The map display can include a geographic map that includes respective locations of the plurality of vehicles, including a first set of the plurality of vehicles assigned to a first remote vehicle support queue monitored by a first vehicle manager of a plurality of vehicle managers (or by a first control station of a plurality of first level control stations). As an example, the map display can include a display such as the map portion 5020, illustrated in FIG. 5, and the map portion 7020 illustrated in FIG. 7.

At operation 12070, a vehicle status or state display is generated by the remote vehicle support apparatus. The vehicle state display includes a representation of the state data for the first set of the plurality of vehicles as respective indicators. The first state data of the first vehicle can be represented by a first indicator. For example, the vehicle state display includes indicators such as the vehicle indicator 4000, illustrated in FIG. 4, and the vehicle indicator 6000, illustrated in FIG. 6. In an implementation, the map display generated via operation 12060 includes a display of the same vehicles of the first set of the plurality of vehicles within the vehicle state display that is adjacent to the map display. In an implementation, the vehicle state display is similar to the vehicle manager portion 7010 of the vehicle manager interface 7000 illustrated in FIG. 7.

Figure 13:
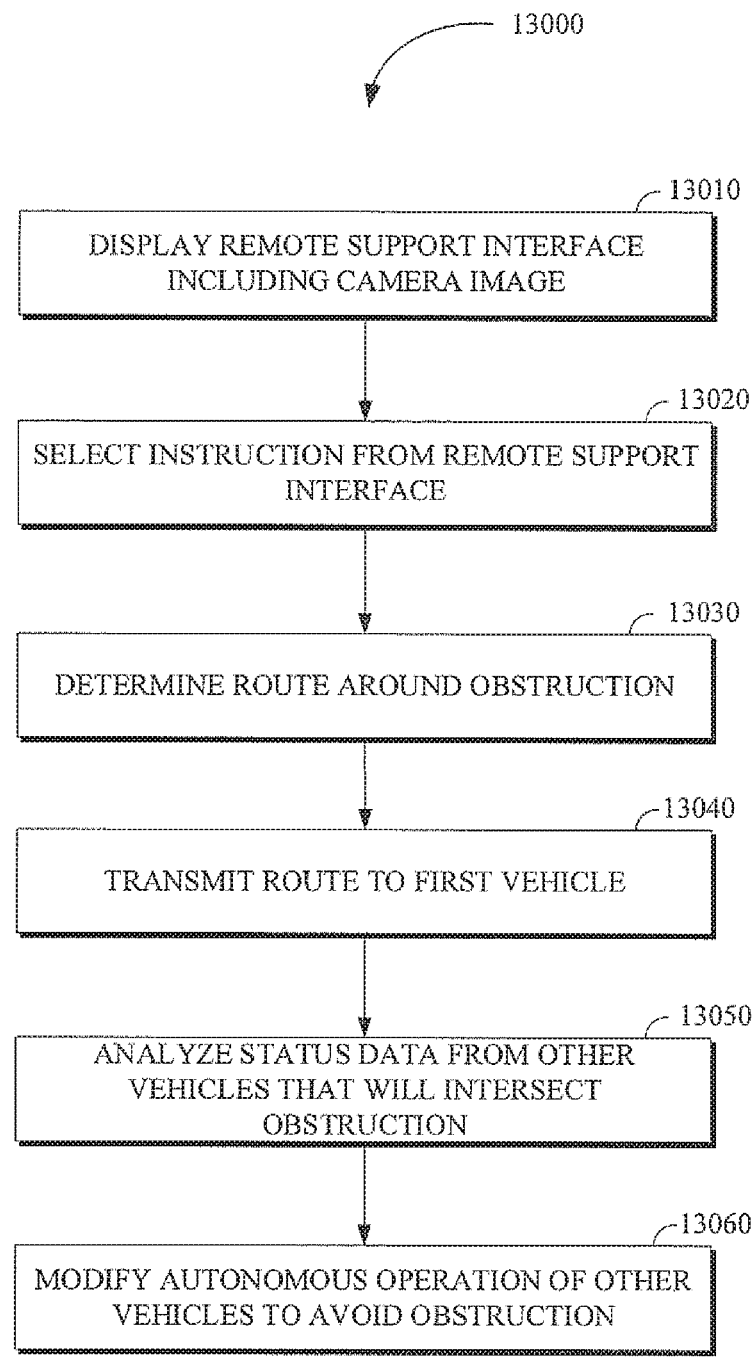
FIG. 13 is a flow chart of a technique for remote support of autonomous vehicles in accordance with the present disclosure.

FIG. 13 is a flow chart of a technique 13000 for remote support of autonomous vehicles in accordance with the present disclosure. Some or all aspects of the technique 13000 for remote support may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 13000 for remote support can be implemented in a system combining some or all of the features described in this disclosure.

At operation 13010, responsive to an input signal to a first indicator (e.g., a vehicle manager clicks on a vehicle indicator associated with a first vehicle), a remote support interface for one or more vehicles, including a first vehicle, is generated and displayed. The remote support interface displays image data including but not limited to at least one camera image from the vehicle (e.g., a camera mounted externally to the vehicle that images the surrounding environment). The transmission of instruction data that is sent by the vehicle manager to modify the autonomous operation of the vehicle is initiated through the remote support interface. In an implementation, the image data includes any of an image of a passenger within the first vehicle, an image of an obstruction ahead of the first vehicle, and any image associated with the first vehicle.

At operation 13020, a remote support interface is generated and is used to select an instruction indication from the remote support interface. The remote support interface can be coupled to an input device through which instruction signals can be input. For example, an operator of the remote support interface can select an instruction including but not limited to "change lanes" that is intended for transmission to one of the vehicles that the operator is monitoring within their respective remote vehicle support queue (or first level control station). The instruction can be selected based on the state/status data of the vehicle that may, for example, indicate that there is an accident blocking one of the lanes up ahead and changing lanes at the present time could save on travel time.

At operation 13030, based on the image data that can indicate an obstruction associated with a current route of the first vehicle that may negatively impact parameters including but not limited to travel time, a new route can be determined to allow transit of the vehicle around the obstruction (or to avoid the obstruction altogether) that deviates from the current route determined via autonomous operation of the first vehicle. This example highlights how the remote support and control of the first vehicle that is functioning autonomously can optimize the performance of the first vehicle.

At operation 13040, the new route that is generated can be included in instruction data that is transmitted to the vehicle that is obstructed. For example, the instruction data could be transmitted through a network including a wireless network (e.g. cellular network) or any other communication link, system, or platform between the remote support system and the vehicle being monitored/supported.

At operation 13050, the state data from the other vehicles other than the first vehicle that have a respective route that will similarly intersect (or come in close proximity to) any of the vehicle and the obstruction is analyzed. For example, sensors in the first vehicle can be used to determine when the first vehicle or an external object, including another vehicle, will intersect. The aggregate data (including current data, route data, etc.) collected from all of the plurality of vehicles can also be utilized to determine whether any other vehicles could be affected by the same obstruction.

At operation 13060, if a determination is made that other vehicles will also be impacted by the obstruction, remote support to at least one of the other vehicles other than the first vehicle is provided. The remote support can be provided by transmitting the instruction data to modify the autonomous operation of the at least one of the other vehicles to avoid the obstruction or wait until the obstruction has been cleared. For example, when an external object, including another vehicle is determined to be on a path to intersect a vehicle, instruction data can be sent to the vehicle to request that the vehicle alter its path. The instruction data can also include an instruction for the vehicle to use an external communication channel such as an external speaker, to indicate to external objects including pedestrians and other vehicles, requesting that the external objects change their path in order to not obstruct passage of the vehicle.

Figure 14:
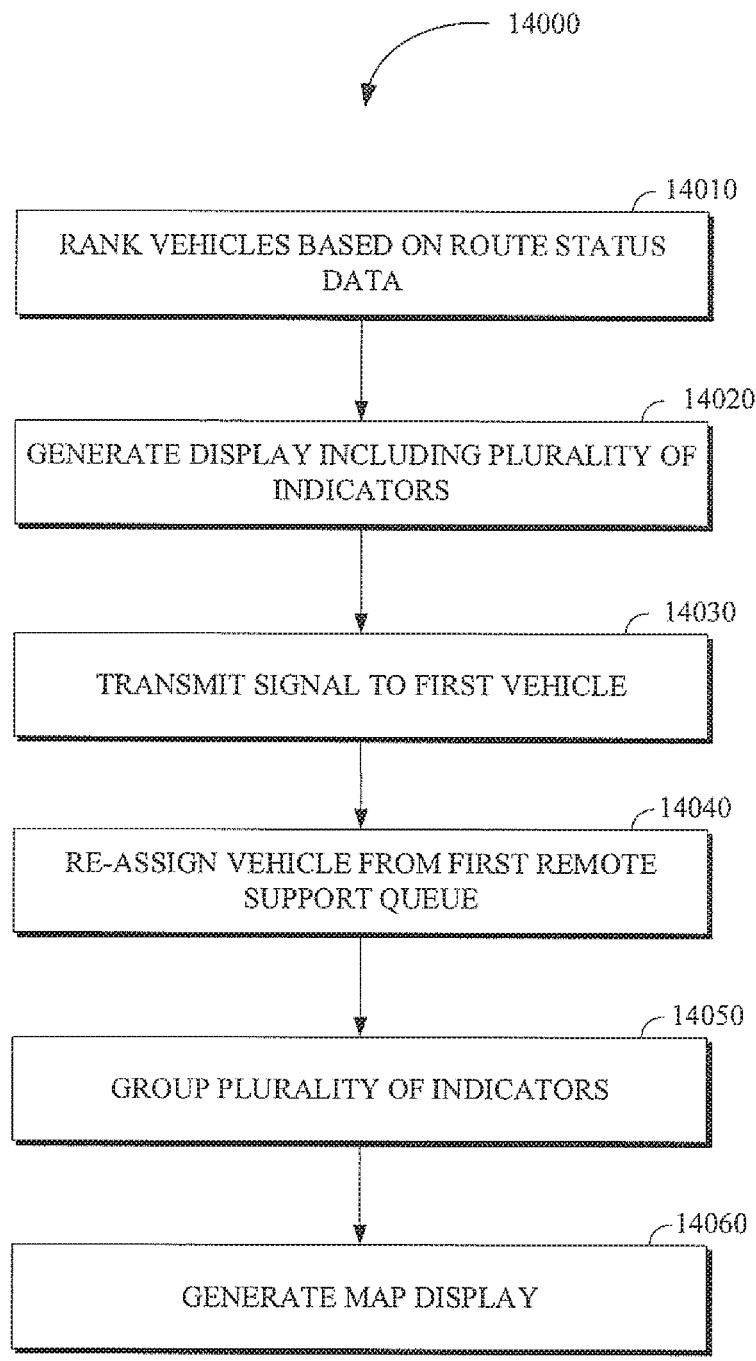
FIG. 14 is a flow chart of a technique for remote support of autonomous vehicles in accordance with the present disclosure.

FIG. 14 is a flow chart of a technique 14000 for remote support of autonomous vehicles in accordance with the present disclosure. Some or all aspects of the technique 14000 for remote support may be implemented in a vehicle including the vehicle 1000 shown in FIG. 1, the vehicle 2100 shown in FIG. 2, or a computing apparatus including the controller apparatus 2410 shown in FIG. 2. In an implementation, some or all aspects of the technique 14000 for remote support can be implemented in a system combining some or all of the features described in this disclosure.

At operation 14010, a remote vehicle support apparatus ranks the vehicles, including a first vehicle, based on state (or status) data for the vehicles. The state data of the first vehicle includes an issue state of the first vehicle. The issue state indicates any of a normal state, such as when the vehicle, the vehicles occupants, and the external objects around the vehicle are within regular operating parameter values, an issue with a passenger, an issue with traffic, a physical issue of the first vehicle, and an issue related to a decision of the autonomous control of the first vehicle.

At operation 14020, a display including a plurality of indicators arranged in accordance with the ranking is generated. Each indicator of the plurality of indicators represents state data of a respective vehicle, and each of the vehicles is assigned to one of the respective remote vehicle support queues (or first level control stations monitored by a vehicle manager) based on the ranking. Each remote vehicle support queue is configured to provide the remote support to assigned vehicles using respective indicators of the assigned vehicles. In other words, each remote vehicle support queue monitors a set of vehicles and each indicator for each respective vehicle of the set of vehicles is displayed in vehicle indicator format (such as the vehicle indicator 6000 of FIG. 6) with an interface of the remote vehicle support apparatus.

At operation 14030, in response to an interaction with a first indicator representing a first vehicle (e.g., an operator selects or highlights the first indicator displayed on the interface), instruction data is transmitted to the first vehicle of the vehicles. For example, the interaction can include any of a haptic input, such as touching a touchscreen display, an audible input, such as a voice command, and a visual input, such as a gesture captured by an optical sensor. The instruction data can include an instruction to cause the autonomous operation of the first vehicle to make a change in the operation of the vehicle that provides a benefit (e.g., to follow a new route of travel to avoid traffic congestion or an obstruction) or that is necessary (e.g., bring the vehicle back to a base for refueling or maintenance). For example, the instruction data can change the route of travel of the vehicle to arrive at the same destination using a different route but in a shorter time.

At operation 14040, based on a received input, at least one vehicle currently assigned to one of the remote vehicle support queues that is determined to be over-tasked is assigned to another one of the remote vehicle support queues that is not over-tasked based on the state data. In this way, the workload between the remote vehicle support queues can be balanced. In another implementation, the vehicles are reassigned based on historical data and feedback garnered from similar situations and the ways in which the vehicle managers (monitoring each of the remote vehicle support queues) handled the issues in the past. For example, if a vehicle manager has been reviewed as not being as responsive to a certain type of remote support request, the vehicle can be reassigned from that vehicle manager to another vehicle manager with better reviews. In addition, the vehicles can be automatically and dynamically reassigned using machine learning techniques that utilize various algorithms to determine the most optimized assignment configurations.

At operation 14050, at least some of the plurality of indicators of the vehicles are grouped for display based on shared entries in the state data. The shared entries can include but are not limited to a route of travel. For example, the plurality of indicators can be grouped according to a shared destination based on the route of travel information in the state data. In another example, the plurality of indicators are grouped based on priority or importance levels.

At operation 14060, a map display that corresponds to a defined geographical area is generated by the remote vehicle support apparatus. The map display can be generated concurrently (e.g., side by side) with the display that includes the plurality of indicators. The map display can include an icon for each of the vehicles within the defined geographical area and the icon can comprise various attributes of the vehicle being displayed (e.g., travel direction, travel duration, fuel level, etc.).

Figure 15:
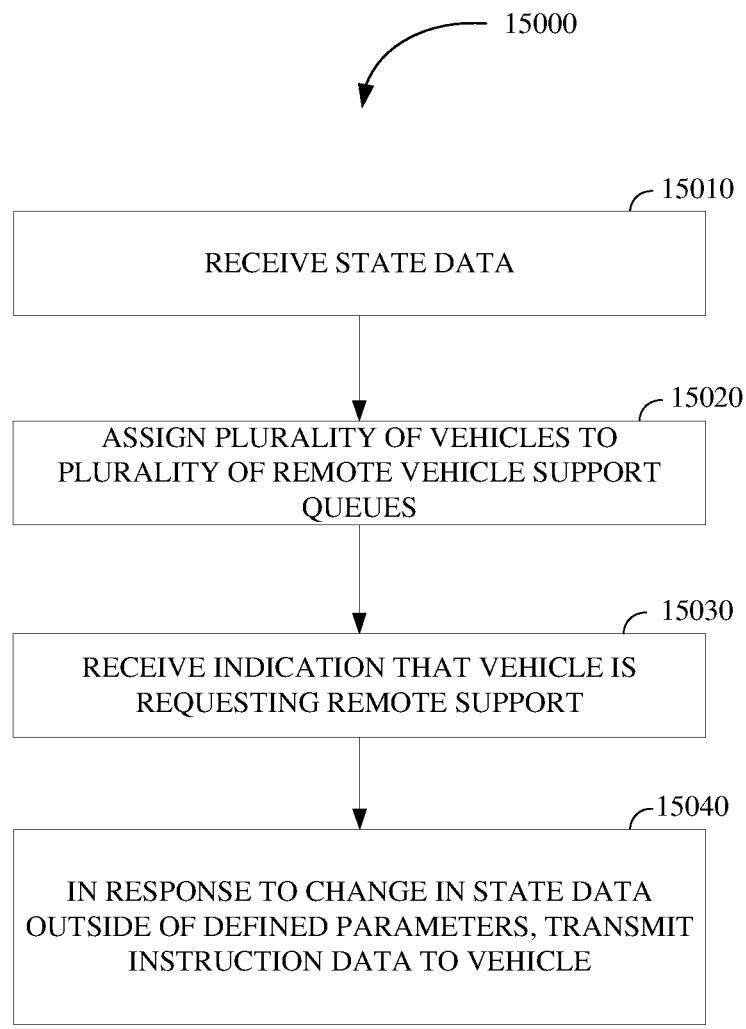
FIG. 15 is a flow chart of a method for providing remote support of autonomous operation of a plurality of vehicles in accordance with the present disclosure.

FIG. 15 is a flow chart of a method 15000 for providing remote support of autonomous operation of a plurality of vehicles in accordance with the present disclosure. The method 15000 includes receiving, by a remote vehicle support apparatus, state (or status) data for the plurality of vehicles, wherein the state data includes a current state (or status information) of the plurality of vehicles via 15010. The method 15000 includes assigning, by the remote vehicle support apparatus, the plurality of vehicles to a plurality of remote vehicle support queues (or control stations) based on the state data via 15020. Each of the plurality of remote vehicle support queues includes a subset of the plurality of vehicles and the subset can be reassigned by an operator (e.g., fleet manager) of the remote vehicle support apparatus.

In FIG. 15, the method 15000 also includes receiving, by the remote vehicle support apparatus, an indication that a vehicle of the plurality of vehicles is requesting remote support via 15030. In other words, the remote vehicle support apparatus receives a request from one of the plurality of vehicles that support or help is requested. After receiving the request for remote support or help, and in response to a determination that a change in the state data is operating outside of defined parameters, the method 15000 includes transmitting, by the remote vehicle support apparatus, instruction data to the vehicle via 15040. As such, the instruction data modifies the autonomous operation of the vehicle. The instruction data can enable the vehicle to overcome the issue that prompted the request for remote support from the remote vehicle support apparatus.

The disclosed technology provides a remote monitoring system that more efficiently distributes workloads among operators of the remote monitoring system (e.g., human operators such as fleet managers and vehicle managers), tasked with managing autonomous vehicles. Further, the disclosed technology is able to more effectively organize data (e.g., key status and environmental and route data related to vehicles being monitored) relating to the operation of autonomous vehicles, thereby providing human operators with a way to proactively manage the autonomous and semi-autonomous vehicles. The remote monitoring system incorporates external data such as real-time traffic data to aid in the instruction data that is generated and transmitted to the vehicles for optimized performance. In this way, the flow of the autonomous vehicles through a particular transportation network is enhanced, which improves the utilization of available transportation resources, increases passenger safety, and improves on-time arrival of passengers and cargo.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A system, comprising:
a memory; and
a processor configured to execute instructions stored in the memory to:
assign vehicles to support queues based on state data, generate a map display including locations of the vehicles, and generate a state display including the support queues, vehicle manager indicators corresponding to the support queues and state indicators corresponding to the state data.

2. The system of claim 1, wherein the processor is further configured to execute instructions stored in the memory to:

receive a request from a vehicle for remote support; and
transmit instruction data to the vehicle to provide the remote support.

3. The system of claim 1, wherein the processor is further configured to execute instructions stored in the memory to:

responsive to autonomous operation of a vehicle operating outside of defined parameter values, transmit instruction data to the vehicle to modify the autonomous operation of the vehicle.

4. The system of claim 1, wherein the support queues comprise first level control stations, each first level control station receiving the state data for different vehicles.

5. The system of claim 4, wherein the vehicles are assigned to the first level control stations using a second level control station.

6. The system of claim 1, wherein the state data includes any of kinetic state data and location data for the vehicles.

7. The system of claim 1, wherein the processor is further configured to execute instructions stored in the memory to:

responsive to an input signal to a first state indicator representing state data of a vehicle, generate a remote support interface display including image data associated with the vehicle.

8. A method, comprising:

assigning vehicles to support queues based on state data;
generating a map display including locations of the vehicles;
generating a state display including the support queues, vehicle manager indicators corresponding to the support queues and state indicators corresponding to the state data; and
tracking autonomous operation of the vehicles.

9. The method of claim 8, further comprising:

receiving a request from a vehicle for remote support; and
transmitting instruction data to the vehicle to provide the remote support.

10. The method of claim 8, further comprising:

responsive to autonomous operation of a vehicle operating outside of defined parameter values, transmitting instruction data to the vehicle to modify the autonomous operation of the vehicle.

11. The method of claim 10, wherein the support queues comprise first level control stations, each first level control station receiving the state data for different vehicles.

12. The method of claim 11, further comprising:

prior to transmitting the instruction data to the vehicle, assigning, by a second level control station, the vehicle from a first control station to a second control station based on a change in the state data for the vehicle.

13. The method of claim 8, further comprising:

responsive to an input signal to a first state indicator representing state data of a vehicle, generating a remote support interface display including image data associated with the vehicle.

14. The method of claim 13, wherein the image data comprises any of an image of an individual within the vehicle and an image of an environment around the vehicle.

15. The method of claim 13, wherein the image data comprises an image of an obstruction in proximity to the vehicle, the method further comprising:

determining a new route that avoids the obstruction and deviates from a current route; and
transmitting the new route to the vehicle to modify autonomous operation of the vehicle.

16. The method of claim 15, further comprising:

analyzing the state data of at least one of the vehicles other than the vehicle in proximity to the obstruction; and
transmitting instruction data to the at least one of the vehicles to modify the autonomous operation of the at least one of the vehicles.

17. The method of claim 8, further comprising:

ranking the vehicles based on the state data; and
generating the state display by assigning each of the vehicles to a respective one of the support queues based on the ranking.

18. The method of claim 8, further comprising:

assigning at least one vehicle from one of the support queues that is determined as being over-tasked to another of the support queues that is determined as not being over-tasked.

19. The method of claim 8, wherein the state data includes an issue state, the issue state indicating any of a normal state, an issue with an operator, an issue with a passenger, an issue with traffic, an issue with an external environment, a physical issue of the vehicle, and an issue related to a decision based on autonomous operation of the vehicle.

20. A non-transitory computer-readable storage medium, wherein the non-transitory computer-readable storage medium includes executable instructions that, when executed by a processor, facilitate performance of operations, the operations comprising:

assigning vehicles to support queues based on state data;
generating a map display including locations of the vehicles;
generating a state display including the support queues, vehicle manager indicators corresponding to the support queues and state indicators corresponding to the state data; and
tracking autonomous operation of the vehicles.

* * * * *